(12) United States Patent
Kobayashi et al.

(10) Patent No.: US 11,843,880 B2
(45) Date of Patent: Dec. 12, 2023

(54) PHOTOELECTRIC CONVERSION DEVICE

(71) Applicant: CANON KABUSHIKI KAISHA, Tokyo (JP)

(72) Inventors: Hideo Kobayashi, Tokyo (JP); So Hasegawa, Kanagawa (JP); Yu Katase, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/704,046

(22) Filed: Mar. 25, 2022

(65) Prior Publication Data

US 2022/0321812 A1 Oct. 6, 2022

(30) Foreign Application Priority Data

Apr. 1, 2021 (JP) ................................. 2021-062658

(51) Int. Cl.
*H04N 25/677* (2023.01)
*H04N 25/75* (2023.01)
*H04N 25/709* (2023.01)

(52) U.S. Cl.
CPC ......... *H04N 25/677* (2023.01); *H04N 25/709* (2023.01); *H04N 25/75* (2023.01)

(58) Field of Classification Search
CPC .... H04N 25/677; H04N 25/709; H04N 25/75; H04N 25/627
USPC ....................................................... 348/308
See application file for complete search history.

(56) References Cited

U.S. PATENT DOCUMENTS

| | | |
|---|---|---|
| 7,990,440 B2 | 8/2011 | Kobayashi |
| 8,710,558 B2 | 4/2014 | Inoue |
| 8,835,828 B2 | 9/2014 | Kobayashi |
| 8,884,391 B2 | 11/2014 | Fudaba |
| 9,264,641 B2 | 2/2016 | Kobayashi |

(Continued)

FOREIGN PATENT DOCUMENTS

| | | |
|---|---|---|
| JP | 2007-43324 A | 2/2007 |
| JP | 2013-85110 A | 5/2013 |

(Continued)

OTHER PUBLICATIONS

U.S. Appl. No. 17/588,484, filed Jan. 31, 2022 by Hideo Kobayashi.

(Continued)

*Primary Examiner* — Lin Ye
*Assistant Examiner* — Chan T Nguyen
(74) *Attorney, Agent, or Firm* — VENABLE LLP

(57) ABSTRACT

The photoelectric conversion device includes a pixel including a photoelectric conversion element and outputting a signal corresponding to an amount of charge generated in the photoelectric conversion element, an output line from which a signal of the pixel is output, a clip circuit constituting a source follower circuit and including a transistor having a source connected to the output line and an interconnection connected to a gate of the transistor, and a voltage supply circuit configured to supply a first voltage and a second voltage to the interconnection. A driving power when the interconnection is controlled to the first voltage by the voltage supply circuit and a driving power when the interconnection is controlled to the second voltage by the voltage supply circuit is different.

26 Claims, 14 Drawing Sheets

(56) References Cited

U.S. PATENT DOCUMENTS

| | | |
|---|---|---|
| 9,357,122 B2 | 2/2016 | Kobayashi |
| 9,305,954 B2 | 4/2016 | Kato |
| 9,407,847 B2 | 8/2016 | Maehashi |
| 9,438,828 B2 | 9/2016 | Itano |
| 9,509,931 B2 | 11/2016 | Kobayashi |
| 9,602,752 B2 | 3/2017 | Koyayashi |
| 10,015,430 B2 | 7/2018 | Kobayashi |
| 10,609,316 B2 | 3/2020 | Kobayashi |
| 11,268,851 B2 | 3/2022 | Kobayashi |
| 2012/0175503 A1 | 7/2012 | Kuroda |
| 2013/0088625 A1* | 4/2013 | Iwata .................. H04N 25/677 348/300 |
| 2013/0140440 A1 | 6/2013 | Kobayashi |
| 2015/0341582 A1* | 11/2015 | Sakaguchi ............... H04N 5/63 348/301 |
| 2016/0119607 A1* | 4/2016 | Konno ..................... G06T 3/00 348/47 |
| 2016/0227141 A1 | 8/2016 | Koybayashi |
| 2019/0306448 A1* | 10/2019 | Goden ................. H04N 25/771 |
| 2021/0021770 A1 | 1/2021 | Nakazawa |
| 2021/0021777 A1 | 1/2021 | Kobayashi |
| 2021/0021782 A1 | 1/2021 | Sato |
| 2021/0360180 A1 | 11/2021 | Saito |
| 2021/0391365 A1 | 12/2021 | Kobayashi |
| 2022/0030164 A1 | 1/2022 | Kobayashi |
| 2022/0132068 A1 | 4/2022 | Soda |

FOREIGN PATENT DOCUMENTS

| | | |
|---|---|---|
| JP | 2016-58971 A | 4/2016 |
| JP | 2019-50632 A | 3/2019 |

OTHER PUBLICATIONS

U.S. Appl. No. 17/674,906, filed Feb. 18, 2022 by Hideo Kobayashi, et al.
U.S. Appl. No. 17/690,229, filed Mar. 9, 2022 by Hideo Kobayashi.
U.S. Appl. No. 17/690,236, filed Mar. 9, 2022 by Hideo Kobayashi, et al.
U.S. Appl. No. 17/690,255, filed Mar. 9, 2022 by Hideo Kobayashi.
U.S. Appl. No. 17/693,521, filed Mar. 14, 2022 by Hideo Kobayashi.

* cited by examiner

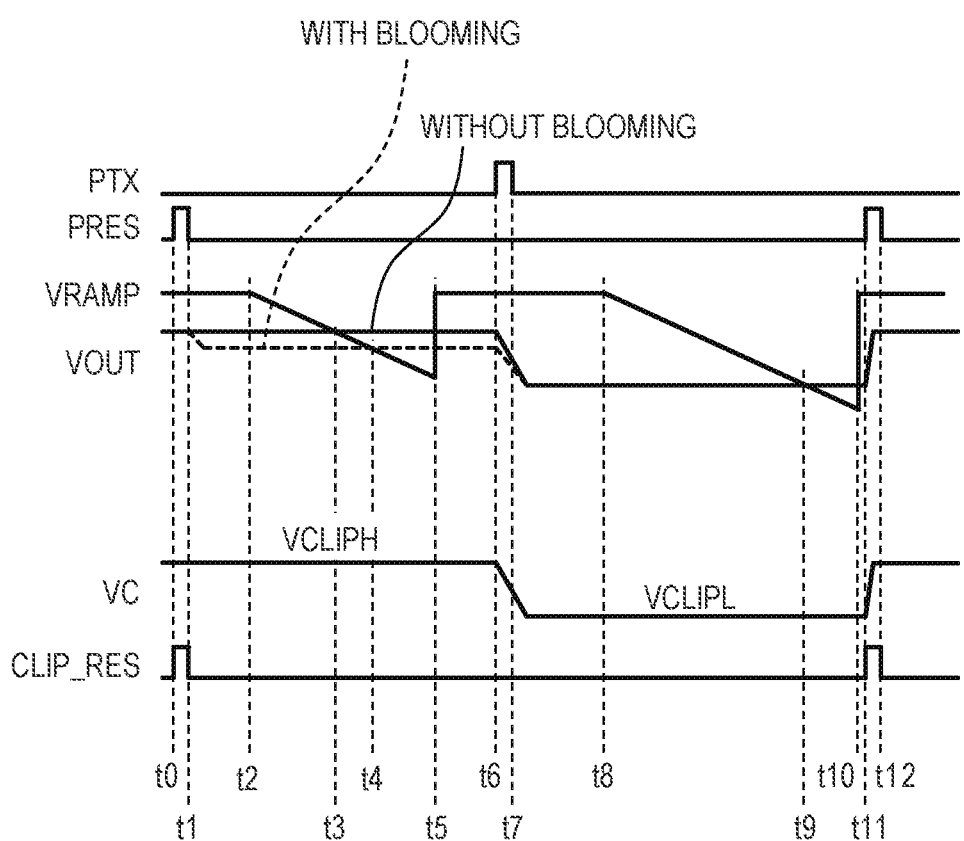

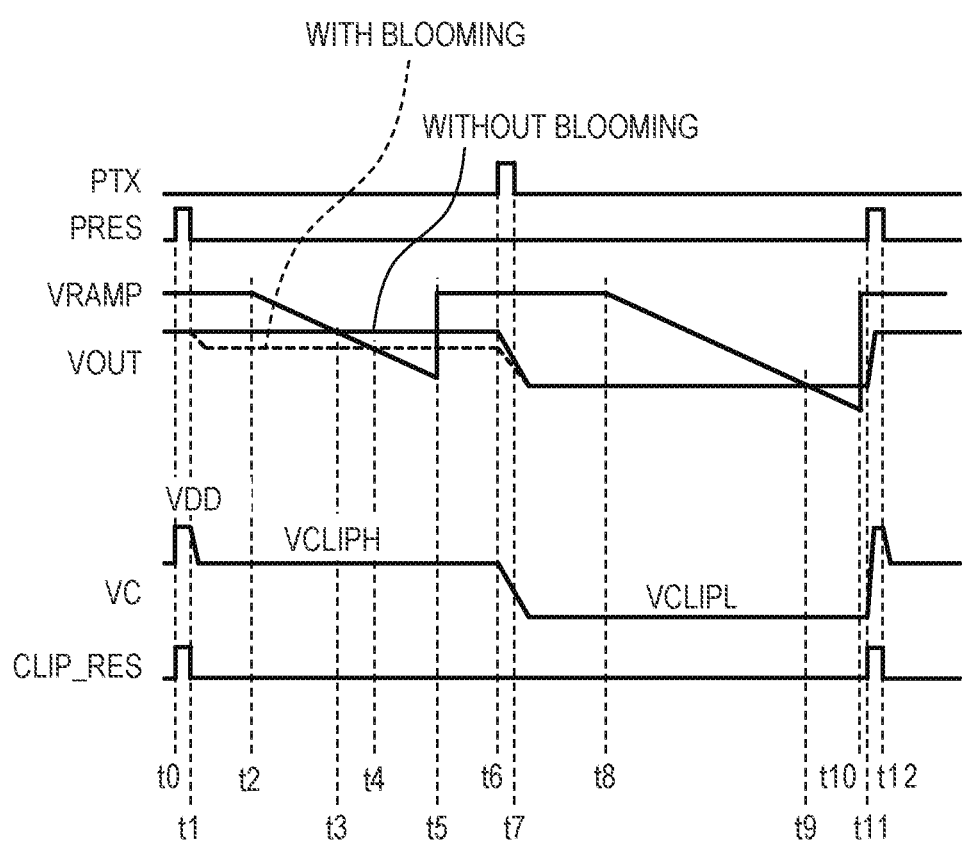

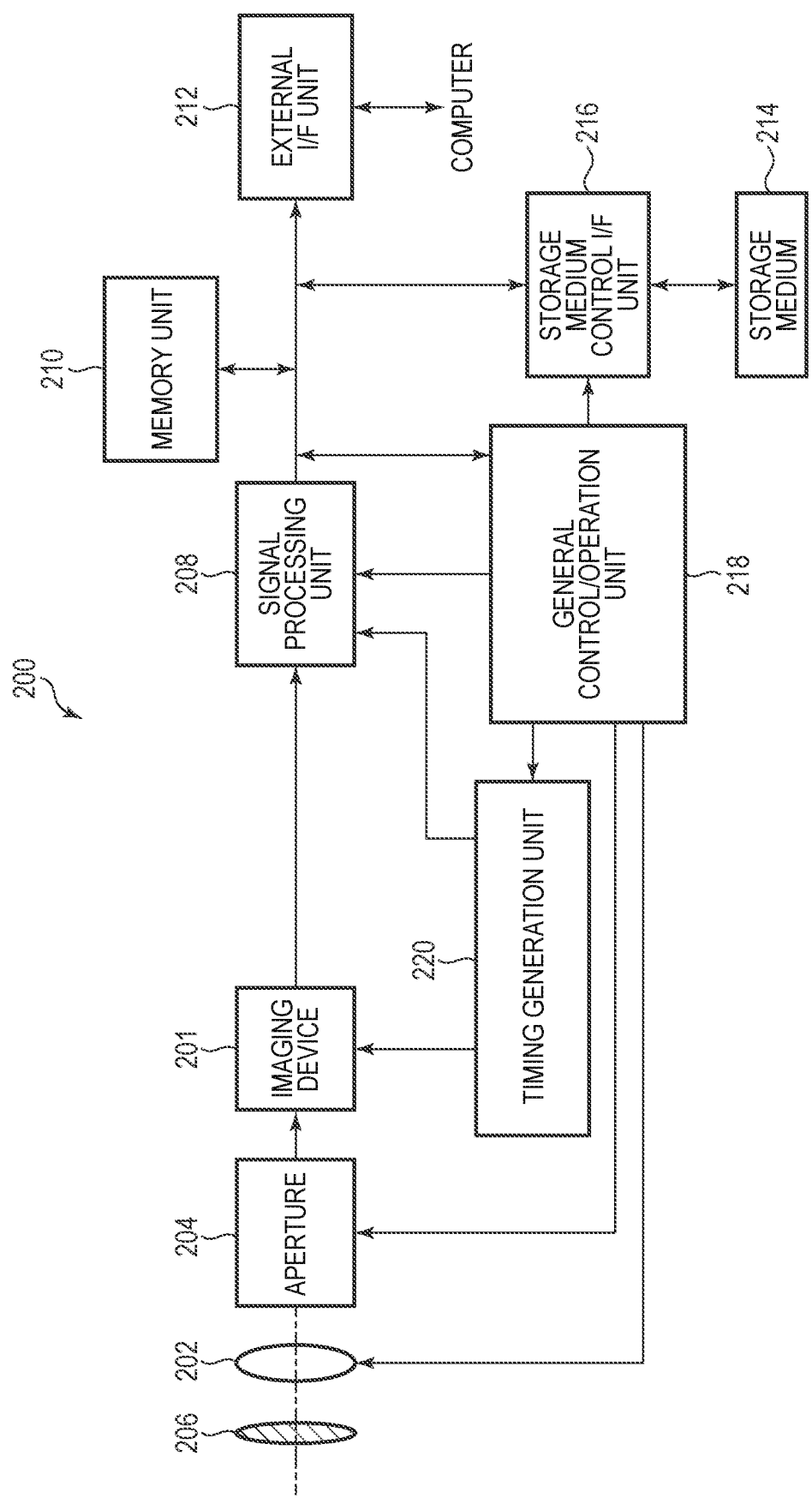

PHOTOELECTRIC CONVERSION DEVICE

BACKGROUND OF THE INVENTION

Field of the Invention

The present invention relates to a photoelectric conversion device.

Description of the Related Art

In the solid-state imaging device, when charge exceeding the saturation charge amount of the photoelectric conversion unit or the holding unit is generated, excess charge may leak out, which may cause deterioration in image quality. A method of setting an output restriction (clip) level to a predetermined node is known for such degradation in image quality. Japanese Patent Application Laid-Open No. 2013-085110 discloses a solid-state imaging device having a clip circuit capable of applying two kinds of voltages to elements for limiting the signal amplitude of a signal line from which a pixel signal is output.

In order to realize higher functionality and higher performance of photoelectric conversion devices, further reduction in circuit area and higher speed are required.

SUMMARY OF THE INVENTION

An object of the present invention is to provide a technique for speeding up a readout operation while suppressing an increase in chip area in a photoelectric conversion device including a clip circuit.

According to an embodiment of the present specification, there is provided a photoelectric conversion device including a pixel including a photoelectric conversion element and outputting a signal corresponding to an amount of charge generated by the photoelectric conversion element, an output line from which a signal of the pixel is output, a clip circuit constituting a source follower circuit and including a transistor having a source connected to the output line and an interconnection connected to a gate of the transistor, and a voltage supply circuit configured to supply a first voltage and a second voltage to the interconnection, wherein a driving power when controlling the interconnection to the first voltage by the voltage supply circuit differs from a driving power when controlling the interconnection to the second voltage by the voltage supply circuit.

Further features of the present invention will become apparent from the following description of exemplary embodiments with reference to the attached drawings.

BRIEF DESCRIPTION OF THE DRAWINGS

FIG. 5 is a timing chart illustrating a method of driving the photoelectric conversion device according to the first embodiment of the present invention.

FIG. 11 is a timing chart illustrating a method of driving the photoelectric conversion device according to the fifth embodiment of the present invention.

FIG. 12 is a block diagram illustrating a schematic configuration of an imaging system according to a sixth embodiment of the present invention.

DESCRIPTION OF THE EMBODIMENTS

Preferred embodiments of the present invention will now be described in detail in accordance with the accompanying drawings.

First Embodiment

Figure 1:
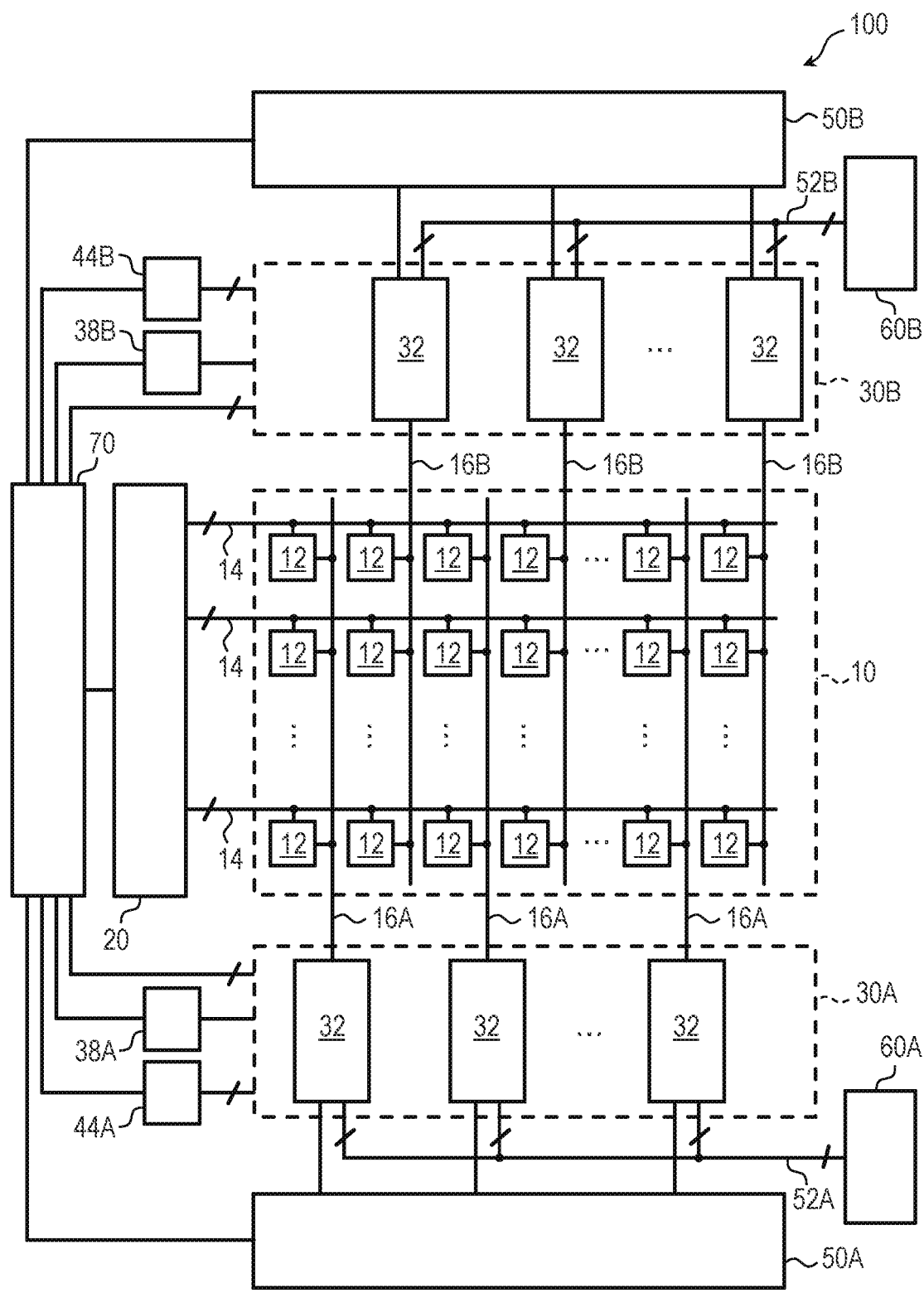
FIG. 1 is a block diagram illustrating a schematic configuration of a photoelectric conversion device according to a first embodiment of the present invention.
Figure 2:
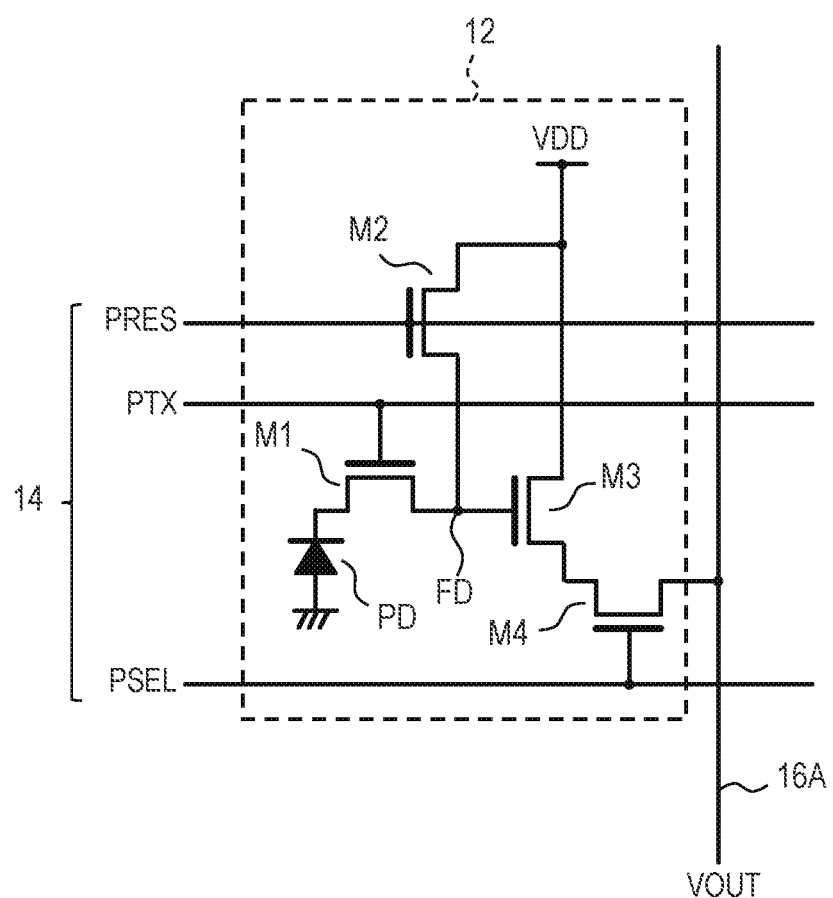
FIG. 2 is a circuit diagram illustrating a configuration example of a pixel in the photoelectric conversion device according to the first embodiment of the present invention.
Figure 3:
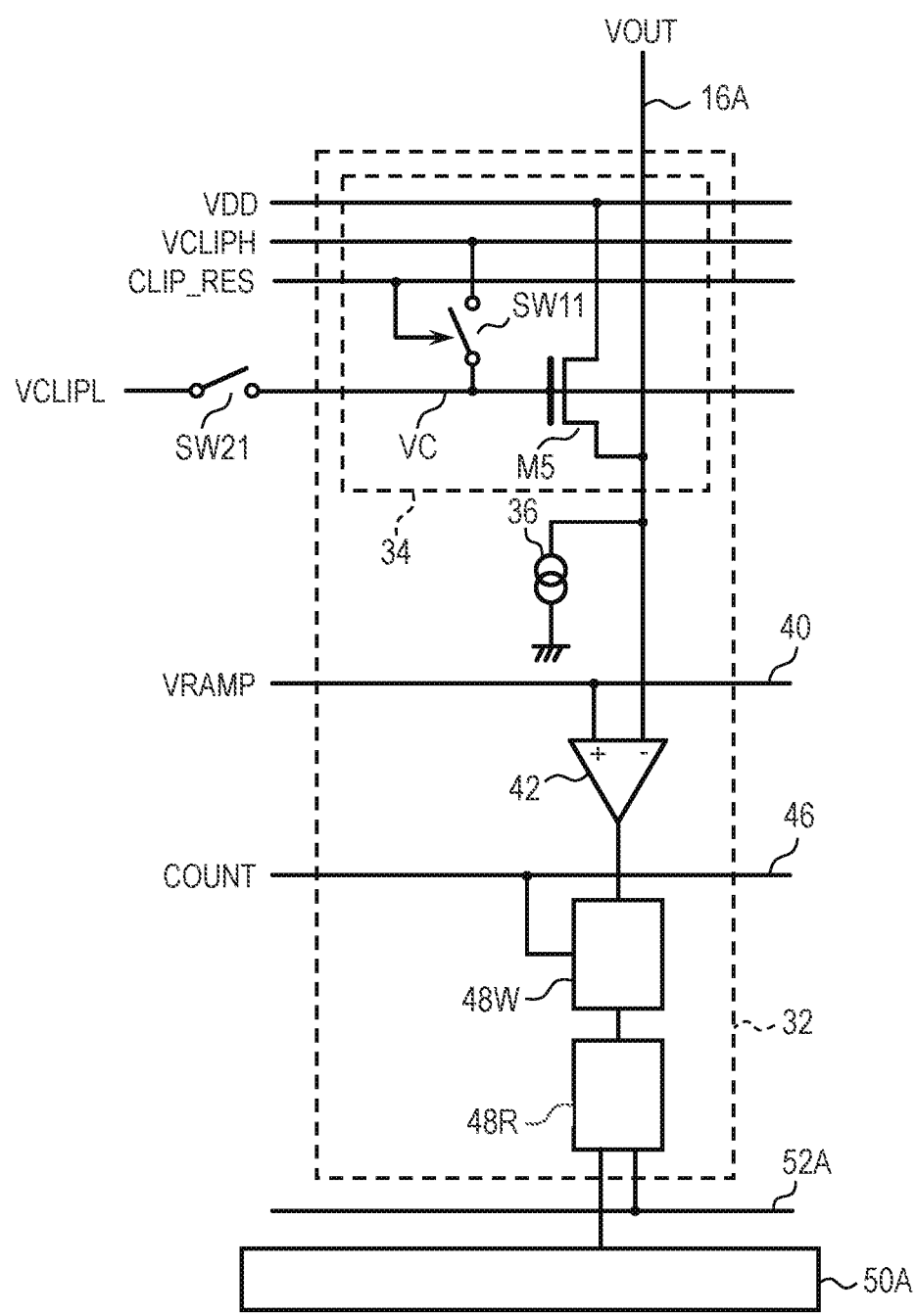
FIG. 3 is a circuit diagram illustrating a configuration example of a column circuit in the photoelectric conversion device according to the first embodiment of the present invention.
Figure 4A:
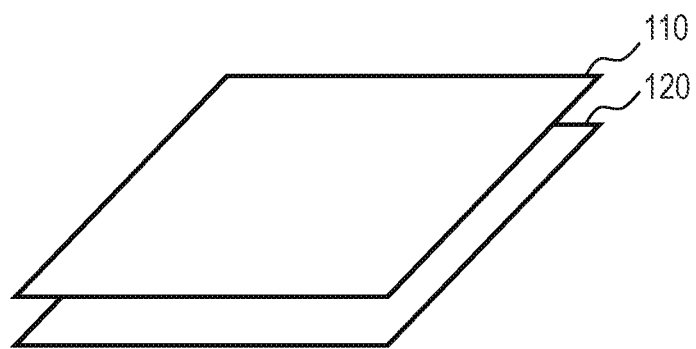
FIG. 4A and FIG. 4B are schematic diagrams illustrating a configuration example of the photoelectric conversion device according to the first embodiment of the present invention.
Figure 4B:
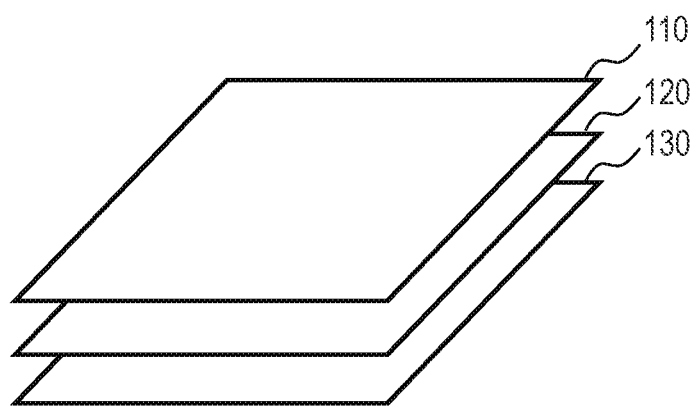

A photoelectric conversion device and a method of driving the same according to a first embodiment of the present invention will be described with reference to FIG. 1 to FIG. 5. FIG. 1 is a block diagram illustrating a schematic configuration of a photoelectric conversion device according to the present embodiment. FIG. 2 is a circuit diagram illustrating a configuration example of a pixel in the photoelectric conversion device according to the present embodiment. FIG. 3 is a circuit diagram illustrating a configuration example of a column circuit in the photoelectric conversion device according to the present embodiment. FIG. 4A and FIG. 4B are schematic diagrams illustrating a configuration example of the photoelectric conversion device according to the present embodiment. FIG. 5 is a timing chart illustrating a method of driving the photoelectric conversion device according to the present embodiment.

First, the structure of the photoelectric conversion device according to the present embodiment will be described with reference to FIG. 1 to FIG. 4B.

As illustrated in FIG. 1, the photoelectric conversion device 100 according to the present embodiment includes a pixel array unit 10, a vertical scanning circuit 20, readout circuits 30A and 30B, reference signal generation circuits 38A and 38B, and counter circuits 44A and 44B. The photoelectric conversion device 100 further includes horizontal scanning circuits 50A and 50B, output circuits 60A and 60B, and a control circuit 70.

The pixel array unit 10 is provided with a plurality of pixels 12 arranged in a matrix over a plurality of rows and a plurality of columns. Each pixel 12 includes a photoelectric conversion unit including a photoelectric conversion element such as a photodiode, and outputs a pixel signal corresponding to the amount of incident light. The number of rows and columns of the pixel array arranged in the pixel array unit 10 is not particularly limited. In addition to effective pixels that output pixel signals corresponding to the amount of incident light, optical black pixels in which the photoelectric conversion unit is shielded from light, dummy pixels that do not output signals, and the like may be arranged in the pixel array unit 10.

In each row of the pixel array unit 10, a control line 14 is arranged so as to extend in a first direction (a lateral direction in FIG. 1). Each of the control lines 14 is connected to each of the pixels 12 aligned in the first direction, and forms a signal line common to these pixels 12. The first direction in which the control lines 14 extend may be referred to as a row direction or a horizontal direction. The control lines 14 are connected to the vertical scanning circuit 20.

In each column of the pixel array unit 10, a vertical output line 16A or a vertical output line 16B is arranged so as to extend in a second direction (vertical direction in FIG. 1) intersecting the first direction. The vertical output lines 16A and the vertical output lines 16B are alternately arranged in each column. For example, the vertical output lines 16A are arranged in odd columns, and the vertical output lines 16B are arranged in even columns. Each of the vertical output lines 16A and 16B is connected to the pixels 12 aligned in the second direction, and forms a signal line common to these pixels 12. The second direction in which the vertical output lines 16A, 16B extend may be referred to as a column direction or a vertical direction. The vertical output lines 16A are connected to the readout circuit 30A. The vertical output lines 16B are connected to the readout circuit 30B.

The vertical scanning circuit 20 receives a control signal output from the control circuit 70, generates a control signal for driving the pixels 12, and supplies the control signal to the pixels 12 via the control line 14. A logic circuit such as a shift register or an address decoder may be used for the vertical scanning circuit 20. The vertical scanning circuit 20 sequentially supplies control signals to the control lines 14 in each row to sequentially drive the pixels 12 of the pixel array unit 10 in units of rows. Signals read out from the pixels 12 in units of rows are input to the readout circuit 30A or the readout circuit 30B via the vertical output lines 16A or the vertical output lines 16B provided in each column of the pixel array unit 10.

The readout circuit 30A includes a plurality of column circuits 32 corresponding to the number of columns in which the vertical output lines 16A are arranged. Each of the plurality of column circuits 32 of the readout circuit 30A is connected to the vertical output line 16A of the corresponding column. The readout circuit 30B includes a plurality of column circuits 32 corresponding to the number of columns in which the vertical output lines 16B are arranged. Each of the plurality of column circuits 32 of the readout circuit 30B is connected to the vertical output line 16B of the corresponding column. The column circuit 32 is a circuit unit that performs predetermined processing, e.g., a signal processing such as amplification processing and analog-to-digital conversion (AD conversion) on the pixel signal read out from the pixel 12 in the corresponding column. The column circuit 32 includes a signal holding circuit for holding the processed pixel signal.

The reference signal generation circuit 38A is connected to the readout circuit 30A. The reference signal generation circuit 38A has a function of receiving a control signal output from the control circuit 70, generating a reference signal for use in AD conversion, and supplying the reference signal to the readout circuit 30A. Similarly, the reference signal generation circuit 38B is connected to the readout circuit 30B. The reference signal generation circuit 38B has a function of receiving a control signal output from the control circuit 70, generating a reference signal for use in AD conversion, and supplying the reference signal to the readout circuit 30B.

The reference signal used for AD conversion may have a predetermined amplitude according to the range of the pixel signal, and the signal level may change with lapse of time. The reference signal is not particularly limited, but may be, for example, a ramp signal in which the signal level monotonically increases or monotonically decreases with lapse of time. The change in the signal level does not necessarily have to be continuous, and may be stepwise. The change in the signal level is not necessarily linear with respect to time, and may be curved with respect to time (e.g., sine wave or cosine wave).

The counter circuit 44A is connected to the readout circuit 30A. The counter circuit 44A performs a count operation in response to a control signal output from the control circuit 70, and outputs a count signal indicating the count value to the readout circuit 30A. The counter circuit 44A starts the counting operation in synchronization with the timing when the signal level of the reference signal supplied from the reference signal generation circuit 38A starts to change. Similarly, the counter circuit 44B is connected to the readout circuit 30B. The counter circuit 44B performs a count operation in response to a control signal output from the control circuit 70, and outputs a count signal indicating the count value to the readout circuit 30B. The counter circuit 44B starts the counting operation in synchronization with the timing when the signal level of the reference signal supplied from the reference signal generation circuit 38B starts to change.

The horizontal scanning circuit 50A receives a control signal output from the control circuit 70, generates a control signal for reading out a pixel signal from the column circuit 32 of the readout circuit 30A, and supplies the control signal to the readout circuit 30A. The horizontal scanning circuit 50A sequentially scans the column circuits 32 of the readout circuit 30A, and sequentially outputs pixel signals held in the column circuits 32 to the output circuit 60A. Similarly, the horizontal scanning circuit 50B is a control unit having a function of receiving a control signal output from the control circuit 70, generating a control signal for reading out a pixel signal from the column circuit 32 of the readout circuit 30B, and supplying the control signal to the readout circuit 30B. The horizontal scanning circuit 50B sequentially scans the column circuits 32 of the readout circuit 30B, and sequentially outputs pixel signals held in the column circuits 32 to the output circuit 60B. A logic circuit such as a shift register and an address decoder may be used for the horizontal scanning circuits 50A and 50B.

The output circuit 60A includes a buffer amplifier, a differential amplifier, and the like, performs predetermined signal processing on the pixel signal of the column selected by the horizontal scanning circuit 50A, and outputs the processed pixel data. Similarly, the output circuit 60B includes a buffer amplifier, a differential amplifier, and the like, performs predetermined signal processing on the pixel signal of the column selected by the horizontal scanning circuit 50B, and outputs the processed pixel data. Examples of the signal processing performed by the output circuits 60A and 60B include correction processing by correlated double sampling (CDS) and amplification processing.

The control circuit 70 generates control signals for controlling the operations of the vertical scanning circuit 20, the readout circuits 30A and 30B, the reference signal generation circuits 38A and 38B, the counter circuits 44A and 44B, and the horizontal scanning circuits 50A and 50B, and supplies the control signals to these functional blocks. At least a part of the control signals for controlling the operations of the vertical scanning circuit 20, the readout circuits 30A and 30B, the reference signal generation circuits 38A and 38B, the counter circuits 44A and 44B, and the horizontal scanning circuits 50A and 50B may be supplied from the outside of the photoelectric conversion device 100.

FIG. 1 illustrates an example in which two readout circuit blocks including a readout circuit block including a readout circuit 30A, a horizontal scanning circuit 50A, an output circuit 60A, and the like, and a readout circuit block including a readout circuit 30B, a horizontal scanning circuit 50B, an output circuit 60B, and the like are provided. However, the number of readout circuit blocks is not necessarily two, and may be one.

As illustrated in FIG. 2, each of the pixels 12 may include a photoelectric conversion element PD, a transfer transistor M1, a reset transistor M2, an amplifier transistor M3, and a select transistor M4. Each pixel 12 may have a microlens and a color filter arranged over an optical path until incident light is guided to the photoelectric conversion element PD. The microlens focuses incident light on the photoelectric conversion element PD. The color filter selectively transmits light of a predetermined color.

The photoelectric conversion element PD is, for example, a photodiode, and has an anode connected to a reference voltage node and a cathode connected to a source of the transfer transistor M1. A drain of the transfer transistor M1 is connected to a source of the reset transistor M2 and a gate of the amplifier transistor M3. A node FD to which the drain of the transfer transistor M1, the source of the reset transistor M2, and the gate of the amplifier transistor M3 are connected is a so-called floating diffusion. The floating diffusion includes a capacitance component (floating diffusion capacitor) and functions as a charge holding portion. The floating diffusion capacitor may include a p-n junction capacitance, an interconnection capacitance, and the like. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the vertical output line 16A (or the vertical output line 16B).

In the pixel configuration of FIG. 2, the control line 14 in each row includes three signal lines connected to a gate of the transfer transistor M1, a gate of the reset transistor M2, and a gate of the select transistor M4. A control signal PTX is supplied from the vertical scanning circuit 20 to the gate of the transfer transistor M1. A control signal PRES is supplied from the vertical scanning circuit 20 to the gate of the reset transistor M2. A control signal PSEL is supplied from the vertical scanning circuit 20 to the gate of the select transistor M4. When each transistor is formed of an n-channel MOS transistor, the corresponding transistor is turned on when a High-level control signal is supplied from the vertical scanning circuit 20. When a Low-level control signal is supplied from the vertical scanning circuit 20, the corresponding transistor is turned off.

In the present embodiment, a case where electrons of electron-hole pairs generated in the photoelectric conversion element PD by light incidence are used as signal charge will be described. When electrons are used as the signal charge, each transistor constituting the pixel 12 may be formed of an n-channel MOS transistor. However, the signal charge is not limited to electrons, and holes may be used as the signal charge. When holes are used as signal charge, the conductivity type of each transistor is opposite to that described in the present embodiment. The source and drain of a MOS transistor may differ depending on the conductivity type of the transistor and the function of interest. Some or all of the names of a source and a drain used in the present embodiment may be referred to as reverse names.

The photoelectric conversion element PD converts incident light into charge of an amount corresponding to the amount of incident light (photoelectric conversion). When the transfer transistor M1 is turned on, the charge held by the photoelectric conversion element PD is transferred to the node FD. The charge transferred from the photoelectric conversion element PD is held in the capacitor (floating diffusion capacitance) coupled to the node FD. As a result, the node FD becomes a potential corresponding to the amount of charge transferred from the photoelectric conversion element PD by charge-voltage conversion by the floating diffusion capacitor.

When the select transistor M4 is turned on, the amplifier transistor M3 is connected to the vertical output line 16A (or the vertical output line 16B). The amplifier transistor M3 has a configuration in which a voltage VDD is supplied to the drain thereof and a bias current is supplied to the source thereof from a current source (a current source 36 to be described later) (not illustrated) via a select transistor M4, and constitutes an amplifier unit (a source follower circuit) having the gate as an input node. Thus, the amplifier transistor M3 outputs a signal based on the voltage of the node FD to the vertical output line 16A (or the vertical output line 16B) via the select transistor M4. In this sense, the amplifier transistor M3 and the select transistor M4 form an output unit that outputs a pixel signal corresponding to the amount of charge held in the node FD.

The reset transistor M2 has a function of controlling the supply of a voltage (voltage VDD) for resetting the node FD as the charge holding portion to the FD node. The reset transistor M2 is turned on to reset the node FD to a voltage corresponding to the voltage VDD.

As illustrated in FIG. 3, for example, each of the plurality of column circuits 32 included in the readout circuit 30A may include a clip circuit 34, a current source 36, a comparator 42, and memories 48W and 48R.

The clip circuit 34 includes an n-channel transistor M5 and a switch SW11. The n-channel transistor M5 has a drain connected to a node to which a power supply voltage (voltage VDD) is supplied, and constitutes a source follower circuit. A source of the n-channel transistor M5 is connected to the vertical output line 16A. One terminal of the switch SW11 is connected to a node to which the voltage VCLIPH is supplied. The other terminal of the switch SW11 and a gate of the n-channel transistor M5 are connected to an interconnection VC. The interconnection VC is an interconnection common to the clip circuits 34 of the plurality of column circuits 32 constituting the readout circuit 30A, and connects the other terminal of the switch SW11 of the clip circuit 34 and the gate of the n-channel transistor M5 to each other. A voltage VCLIPL may be supplied to the interconnection VC via a switch SW21. A control signal CLIP_RES is supplied from the control circuit 70 to the control node of the switch SW11. The control signal CLIP_RES is a control signal common to the plurality of column circuits 32 of the readout circuit 30A.

Note that the voltage VDD, the voltage VCLIPH, and the voltage VCLIPL have the following relationship.

VDD>VCLIPH>VCLIPL

The switch SW11 is an individual switch provided in the clip circuit 34 of each of the plurality of column circuits 32 of the readout circuit 30A. On the other hand, the switch SW21 is a switch common to the clip circuits 34 of the plurality of column circuits 32 of the readout circuit 30A. In other words, the interconnection VC is connected to the node to which the voltage VCLIPH is supplied via a plurality of switches SW11 connected in parallel, and is connected to the node to which the voltage VCLIPL is supplied via one switch SW21.

The clip circuit 34 has a function of limiting the lower limit of the voltage of the vertical output line 16A to a voltage corresponding to a voltage of the gate of the n-channel transistor M5. The gate of the n-channel transistor M5 becomes the voltage VCLIPH when the switch SW11 is on and the switch SW21 is off, and becomes the voltage VCLIPL when the switch SW11 is off and the switch SW21 is on. Here, the switch SW11 is turned on (conductive state) when the control signal CLIP_RES is High-level, and turned off (non-conductive state) when the control signal CLIP_RES is Low-level.

A voltage generation circuit (not illustrated) for generating the voltage VCLIPH, a voltage generation circuit (not illustrated) for generating the voltage VCLIPL, and the switches SW11 and SW21 may also be referred to as a voltage supply circuit for supplying the voltage VCLIPH and the voltage VCLIPL to the interconnection VC.

The current source 36 is connected to the vertical output line 16A. The current source 36 functions as a load current source for the n-channel transistor M5 and the amplifier transistor M3 of the pixel 12.

The comparator 42 has a non-inverting input terminal (+), an inverting input terminal (−), and an output terminal. A non-inverting input terminal of the comparator 42 is connected to the reference signal line 40. The inverting input terminal of the comparator 42 is connected to the vertical output line 16A. The non-inverting input terminal of the comparator 42 is supplied with the reference signal VRAMP from the reference signal generation circuit 38A via the reference signal line 40. The signal VOUT is supplied from the pixel 12 to the inverting input terminal of the comparator 42 via the vertical output line 16A.

The comparator 42 compares the level of the signal VOUT of the vertical output line 16A with the level of the reference signal VRAMP, and outputs a signal corresponding to the result of the comparison. For example, the comparator 42 outputs a High-level signal when the level of the reference signal VRAMP is lower than the level of the signal VOUT. The comparator 42 outputs a Low-level signal when the level of the reference signal VRAMP is higher than the level of the signal VOUT. The relationship between the magnitude of the input signal and the level of the output signal may be reversed.

The memory 48W has two input terminals and one output terminal. One input terminal of the memory 48W is connected to an output terminal of the comparator 42. The other input terminal of the memory 48W is connected to the count signal line 46. The counter circuit 44A supplies the count signal COUNT to the other input terminal of the memory 48W via the count signal line 46. The memory 48R has two input terminals and one output terminal. One input terminal of the memory 48R is connected to the output terminal of the memory 48W. The other input terminal of the memory 48R is connected to the horizontal scanning circuit 50A. The output terminal of the memory 48R is connected to the horizontal output line 52A.

The memory 48W holds the count value indicated by the count signal COUNT supplied from the counter circuit 44A at the timing when the level of the output signal of the comparator 42 is inverted, as digital data of the pixel signal. The memory 48R holds digital data of the pixel signal transferred from the memory 48W. The digital data held in the memory 48R is sequentially transferred to the output circuit 60A via the horizontal output line 52A for each column in accordance with a control signal supplied from the horizontal scanning circuit 50A. By providing the memory 48R subsequent to the memory 48W, the AD conversion operation may be performed in parallel with the transfer operation to the output circuit 60A.

Instead of providing the counter circuit 44A, the memory 48W of the column circuit 32 may have a function of a counter circuit. In this case, the memory 48W of the column circuit 32 of each column receives the common clock signal output from the control circuit 70 and counts the pulses of the clock signal. The count value at the timing when the level of the output signal of the comparator 42 is inverted is digital data held in the memory 48W.

Since the column circuit 32 of the readout circuit 30B is the same as the column circuit 32 of the readout circuit 30A except that the column circuits 32 of the readout circuit 30B are arranged in different columns from the columns in which the column circuits 32 of the readout circuit 30A are arranged, the description thereof will be omitted. Hereinafter, description will be made focusing on the column circuits 32 of the readout circuit 30A, but the same applies to the column circuits 32 of the readout circuit 30B.

The photoelectric conversion device of the present embodiment may be configured such that all of the above-described circuit blocks are arranged on one substrate, or may be configured such that a plurality of substrates is stacked and the circuit blocks are separately formed on each substrate.

FIG. 4A is a schematic diagram when the pixel substrate 110 on which the pixel array unit 10 is arranged and the circuit substrate 120 on which other circuit blocks are arranged are stacked. By arranging the pixel substrate 110 and the circuit substrate 120 on different substrates, the photoelectric conversion device 100 may be miniaturized without sacrificing the area of the pixel array unit 10.

FIG. 4B is a schematic diagram when the pixel substrate 110 on which the pixel array unit 10 is arranged and the circuit substrates 120 and 130 on which other circuit blocks are arranged are stacked. Also in this case, the photoelectric conversion device 100 may be miniaturized without sacrificing the area of the pixel array unit 10.

The circuit elements constituting one functional block are not necessarily arranged on the same substrate, but may be arranged on different substrates.

Next, a method of driving the photoelectric conversion device according to the present embodiment will be described with reference to FIG. 5. FIG. 5 is a timing chart illustrating a pixel signal readout operation in an arbitrary row of the pixel array unit 10. FIG. 5 illustrates the levels of the control signals PTX, PRES, and CLIP_RES, the voltage of the reference signal VRAMP, the voltage of the signal VOUT, and the voltage of the interconnection VC.

It is assumed that the control signal PSEL (not illustrated) of the row to be readout is at High-level immediately before time t0. Thus, the select transistors M4 of the pixels 12 belonging to the row are turned on, and the pixels 12 may output pixel signals to the vertical output lines 16A of the corresponding columns. It is also assumed that the control signals PTX and PRES of the row to be readout are at Low-level immediately before the time t0.

During a period from time t0 to time t1, the vertical scanning circuit 20 controls the control signal PRES of the row to be readout to High-level. Thus, the reset transistor M2 of each of the pixels 12 belonging to the row is turned on, and the node FD is reset to a voltage corresponding to the voltage VDD.

Similarly, during the period from time t0 to time t1, the control circuit 70 controls the control signal CLIP_RES to High-level. Thereby, the switch SW11 of the clip circuit 34 of each column circuit 32 is turned on, and the voltage of the interconnection VC is reset to the voltage VCLIPH.

When the control signal PRES transits from High-level to Low-level at time t1, the reset transistors M2 of the pixels 12 belonging to the row are turned off, and the reset states of the nodes FD of the pixels 12 are released. This state is the reset state of the pixel 12. A pixel signal of a reset level corresponding to the reset voltage of the node FD is output to the vertical output line 16A.

At this time, when the photoelectric conversion element PD is irradiated with very strong light, the charge generated in the photoelectric conversion element PD leaks to the node FD even though the transfer transistor M1 is in an off state, and the potential of the node FD, and consequently the potential of the vertical output line 16A, decreases. The level of the signal VOUT at this time is indicated by a broken line in FIG. 5 ("with blooming"). When there is no leakage of charge from the photoelectric conversion element PD to the node FD, the level of the pixel signal does not change from the reset level as indicated by the solid line in FIG. 5 ("without blooming").

As illustrated in FIG. 5, the level of the signal VOUT at the time of occurrence of blooming is lower than the level of the signal VOUT at the time of normal operation. The level at which the signal VOUT stops decreasing is determined by the voltage VCLIPH applied to the gate of the n-channel transistor M5, the threshold voltage of the n-channel transistor M5, and the like. This is because the n-channel transistor M5 is turned on instead of turning off the amplifier transistor M3 due to a decrease in the potential of the node FD, so that the n-channel transistor M5 clips the potential of the vertical output line 16A to a predetermined potential corresponding to its characteristics.

At subsequent time t2, the reference signal generation circuit 38A starts changing the voltage level of the reference signal VRAMP supplied to the column circuits 32 of the respective columns via the reference signal line 40. The counter circuit 44A starts a counting operation in synchronization with the start of the change in the voltage level of the reference signal VRAMP, and supplies the count signal COUNT indicating the count value to the column circuit 32 of each column via the count signal line 46.

The comparator 42 compares the level of the signal VOUT with the level of the reference signal VRAMP, and inverts the level of the output signal at the timing when the magnitude relation between the level of the signal VOUT and the level of the reference signal VRAMP changes. The memory 48W holds the count value indicated by the count signal COUNT supplied from the counter circuit 44A at the timing when the level of the output signal of the comparator 42 is inverted, as digital data of the pixel signal. In this manner, AD conversion is performed on the pixel signal at the reset level.

When blooming does not occur ("without blooming" in FIG. 5), the level of the reference signal VRAMP becomes equal to the level of the signal VOUT at the subsequent time t3, and the level of the output signal of the comparator 42 is inverted. The memory 48W holds the count value corresponding to the length of the period from the time t2 to the time t3 as digital data of the pixel signal. When blooming occurs ("with blooming" in FIG. 5), the level of the reference signal VRAMP becomes equal to the level of the signal VOUT at the following time t4, and the level of the output signal of the comparator 42 is inverted. The memory 48W holds the count value corresponding to the length of the period from the time t2 to the time t4 as digital data of the pixel signal.

Thus, when blooming occurs, an error may occur in the result of AD conversion of the pixel signal at the reset level depending on a difference in timing at which the level of the output signal of the comparator 42 is inverted.

At subsequent time t5, the reference signal generation circuit 38A resets the reference signal VRAMP to a predetermined level.

At subsequent time t6, the control circuit 70 controls the switch SW21 to be turned on, and supplies the voltage VCLIPL to the interconnection VC. Until the voltage of the interconnection VC transits from the voltage VCLIPH to the voltage VCLIPL, a predetermined time is required in accordance with the parasitic capacitance of the interconnection VC, the current driving capability of the switch SW21, and the like.

Similarly, during a period from time t6 to subsequent time t7, the vertical scanning circuit 20 controls the control signal PTX of the row to be readout to High-level. Thereby, the transfer transistor M1 of each of the pixels 12 belonging to the row is turned on, and the charge accumulated in the photoelectric conversion element PD during the predetermined exposure period is transferred to the node FD.

When blooming does not occur ("without blooming" in FIG. 5), the voltage of the node FD decreases to a voltage corresponding to the amount of charge transferred from the photoelectric conversion element PD, and the potential of the vertical output line 16A also decreases. A pixel signal of an optical signal level corresponding to the voltage of the node FD is output to the vertical output line 16A.

On the other hand, when blooming occurs ("with blooming" in FIG. 5), the potential of the node FD does not affect the potential of the vertical output line 16A because the amplifier transistor M3 is off. Instead, the potential of the vertical output line 16A decreases in response to a decrease in the voltage of the interconnection VC caused by turning on the switch SW21. The signal VOUT at this time is treated as a pixel signal of a photoelectric conversion signal level.

At a subsequent time t8, the reference signal generation circuit 38A starts changing the voltage level of the reference signal VRAMP supplied to the column circuits 32 of the respective columns via the reference signal line 40. The counter circuit 44A starts a counting operation in synchronization with the start of the change in the voltage level of the reference signal VRAMP, and supplies the count signal COUNT indicating the count value to the column circuit 32 of each column via the count signal line 46.

The comparator 42 compares the level of the signal VOUT with the level of the reference signal VRAMP, and inverts the level of the output signal at the timing when the magnitude relation between the level of the signal VOUT and the level of the reference signal VRAMP changes. The memory 48W holds the count value indicated by the count signal COUNT supplied from the counter circuit 44A at the timing when the level of the output signal of the comparator 42 is inverted, as digital data of the pixel signal. In this manner, AD conversion is performed on the pixel signal of the photoelectric conversion signal level.

At a subsequent time t10, the reference signal generation circuit 38A resets the reference signal VRAMP to a predetermined level.

The digital data of the pixel signals acquired in this way are subjected to correction processing by correlated double sampling in the subsequent output circuit 60A. In the correction processing by the correlated double sampling, the digital data of the pixel signal of the reset level is subtracted from the digital data of the pixel signal of the photoelectric conversion signal level to remove the noise component superimposed on the pixel signal of the photoelectric conversion signal level. When blooming occurs, as described above, an error may occur in the AD conversion result of the pixel signal of the reset level depending on a difference in timing at which the level of the output signal of the comparator 42 is inverted. Therefore, by performing the correction process by the correlated double sampling, a reasonable result of the saturation output may not be obtained.

However, by appropriately setting the voltage VCLIPL and the voltage VCLIPH, a saturation output may be obtained even when blooming occurs. Here, an example of the saturation output is that the AD conversion result is the maximum value. For example, when the gradation of AD conversion is represented by 12 bits, it means that a result of 4096 LSB is obtained with a quantization unit of 1 LSB. That is, the saturation output may be obtained by ensuring the amount of decrease in the potential of the vertical output line 16A at time t6 to be equal to or more than a voltage corresponding to a voltage of 1 LSB×4096.

The amount of decrease in the potential of the vertical output line 16A at time t6 corresponds to a difference between the voltage of the vertical output line 16A when the gate voltage of the n-channel transistor M5 is the voltage VCLIPH and the voltage of the vertical output line 16A when the gate voltage of the n-channel transistor M5 is the voltage VCLIPL. Therefore, by appropriately setting the voltage VCLIPH and the voltage VCLIPL such that the amount of decrease in the potential of the vertical output line 16A becomes equal to or greater than the voltage of 1 LSB×4096, a saturation output may be obtained even when blooming occurs.

During a period from subsequent time t11 to the time t12, the vertical scanning circuit 20 controls the control signal PRES of the row to be readout to High-level. Thus, the reset transistor M2 of each of the pixels 12 belonging to the row is turned on, and the node FD is reset to a voltage corresponding to the voltage VDD.

When the control signal PRES transits from High-level to Low-level at time t12, the reset transistors M2 of each of the pixels 12 belonging to the row are turned off, and the reset states of the nodes FD of the pixels 12 are released. Thus, the signal VOUT of the vertical output line 16A also returns to the reset level.

Similarly, during the period from time t11 to time t12, the control circuit 70 controls the control signal CLIP_RES to High-level. Thus, the switch SW11 of the clip circuit 34 of the column circuit 32 of each column is turned on, and the voltage of the interconnection VC transitions from the voltage VCLIPL to the voltage VCLIPH. Thus, the vertical output line 16A may be reset by the amplifier transistor M3 and the n-channel transistor M5, and a time required for resetting the vertical output line 16A may be shortened.

In the driving example of the present embodiment, since the length of the period from time t7 to time t8 is set so as to ensure the settling time of the vertical output line 16A, the speed at which the interconnection VC transitions from the voltage VCLIPH to the voltage VCLIPL at time t6 may be low. Therefore, in the present embodiment, no switch is provided for each clip circuit 34 between the node to which the voltage VCLIPL is supplied and the interconnection VC. Thus, an increase in the circuit area of the clip circuit 34 may be suppressed.

Thus, in the present embodiment, the driving power when the interconnection VC connected to the gate of the n-channel transistor M5 transits from the voltage VCLIPL to the voltage VCLIPH is relatively higher than the driving power when the interconnection VC transits from the voltage VCLIPH to the voltage VCLIPL. This makes it possible to increase the speed while suppressing an increase in chip area.

Here, the driving power refers to the difference between the ON resistance of the switch between the VCLIPH node and the interconnection VC and the ON resistance of the switch between the VCLIPL node and the interconnection VC due to the difference between the number of switches SW11 and the number of switches SW21. That is, the lower the ON resistance of the switch, the higher the driving power of the interconnection VC. Due to the difference in driving power, the transition speed from the voltage VCLIPL to the voltage VCLIPH from the time t11 is higher than the transition speed from the voltage VCLIPH to the voltage VCLIPL from the time t6. That is, it may be said that the transition speeds are relatively different.

Although not illustrated in FIG. 3, a repeat buffer may be inserted into the signal line transmitting the control signal CLIP_RES to improve the driving power.

As described above, according to the present embodiment, the readout operation may be speeded up while suppressing an increase in chip area.

Second Embodiment

Figure 6:
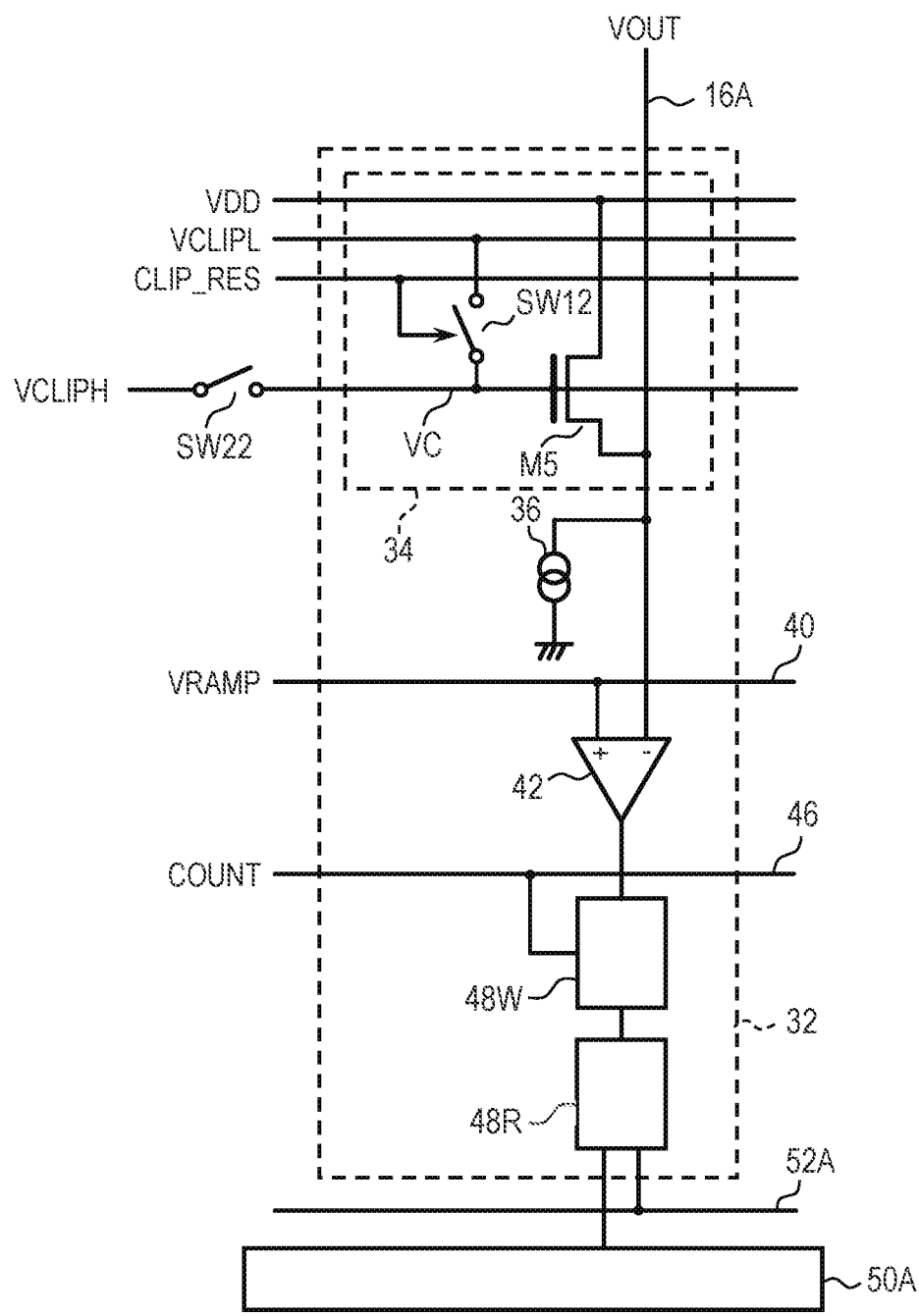
FIG. 6 is a circuit diagram illustrating a configuration example of a column circuit in a photoelectric conversion device according to a second embodiment of the present invention.
Figure 7:
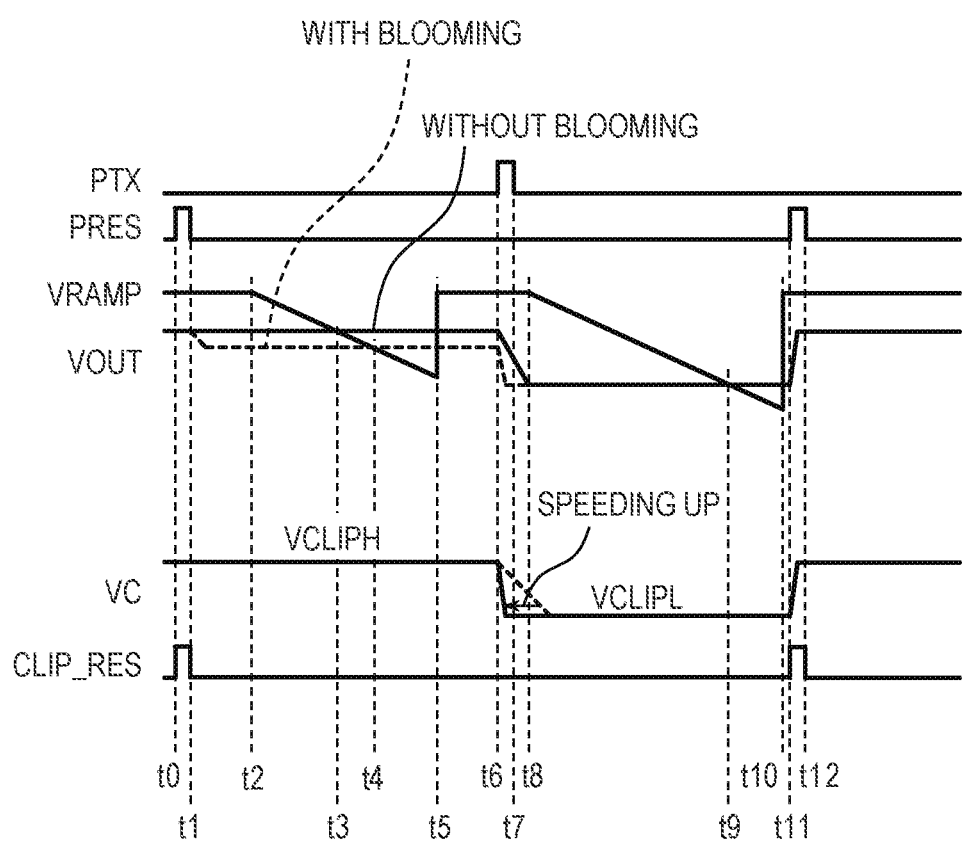
FIG. 7 is a timing chart illustrating a method of driving the photoelectric conversion device according to the second embodiment of the present invention.

A photoelectric conversion device and a method of driving the same according to a second embodiment of the present invention will be described with reference to FIG. 6 and FIG. 7. The same components as those of the photoelectric conversion device according to the first embodiment are denoted by the same reference numerals, and the description thereof will be omitted or simplified. FIG. 6 is a circuit diagram illustrating a configuration example of a column circuit in the photoelectric conversion device according to the present embodiment. FIG. 7 is a timing chart illustrating a method of driving the photoelectric conversion device according to the present embodiment.

The photoelectric conversion device according to the present embodiment is similar to the photoelectric conversion device according to the first embodiment except that the configuration of the clip circuit 34 is different. In the first embodiment, the clip circuit 34 is configured such that the transition speed from the voltage VCLIPL to the voltage VCLIPH is faster than the transition speed from the voltage VCLIPH to the voltage VCLIPL. In contrast, in the present embodiment, the clip circuit 34 is configured such that the transition speed from the voltage VCLIPH to the voltage VCLIPL is relatively faster than the transition speed from the voltage VCLIPL to the voltage VCLIPH.

As illustrated in FIG. 6, the clip circuit 34 of the present embodiment includes an n-channel transistor M5 and a switch SW12. A drain of the n-channel transistor M5 is connected to a node to which a power supply voltage (voltage VDD) is supplied. A source of the n-channel transistor M5 is connected to the vertical output line 16A. One terminal of the switch SW12 is connected to a node to which the voltage VCLIPL is supplied. The other terminal of the switch SW12 and a gate of the n-channel transistor M5 are connected to the interconnection VC. A voltage VCLIPH may be supplied to the interconnection VC via the switch SW22. A control signal CLIP_RES is supplied from the control circuit 70 to the control node of the switch SW12.

Like the switch SW11 of the first embodiment, the switch SW12 is an individual switch provided in the clip circuit 34 of each of the plurality of column circuits 32 of the readout circuit 30A. On the other hand, the switch SW22 is a switch common to the clip circuits 34 of the plurality of column circuits 32 of the readout circuit 30A. In other words, the interconnection VC is connected to the node to which the voltage VCLIPL is supplied via a plurality of switches SW12 connected in parallel, and is connected to the node to which the voltage VCLIPH is supplied via one switch SW22.

The clip circuit 34 has a function of limiting the lower limit of the voltage of the vertical output line 16A to a voltage corresponding to the voltage of the gate of the n-channel transistor M5. The gate of the n-channel transistor M5 becomes the voltage VCLIPL when the switch SW12 is on and the switch SW22 is off, and becomes the voltage VCLIPH when the switch SW12 is off and the switch SW22 is on. Here, the switch SW12 is turned on (conductive state) when the control signal CLIP_RES is High-level, and turned off (non-conductive state) when the control signal CLIP_RES is Low-level.

A voltage generation circuit (not illustrated) for generating the voltage VCLIPH, a voltage generation circuit (not illustrated) for generating the voltage VCLIPL, and the switches SW12 and SW22 may also be referred to as a voltage supply circuit for supplying the voltage VCLIPH and the voltage VCLIPL to the interconnection VC.

Next, a method of driving the photoelectric conversion device according to the present embodiment will be described with reference to FIG. 7 focusing on points different from the driving method according to the first embodiment. FIG. 7 is a timing chart illustrating a pixel signal readout operation in an arbitrary row of the pixel array unit 10. FIG. 7 illustrates the levels of the control signals PTX, PRES, and CLIP_RES, the voltage of the reference signal VRAMP, the voltage of the signal VOUT, and the voltage of the interconnection VC.

In the driving example of the present embodiment, for example, the current value of the current source 36 is increased, and the speed at which the potential of the vertical output line 16A decreases from the time t6 in the normal operation (solid line) is increased, whereby the period from the time t6 to the time t8 is shortened and the speed is increased. At this time, for example, as indicated by a dotted line in FIG. 7, if the rate of decrease in the potential of the interconnection VC from the time t6 is low, the rate of decrease in the potential of the vertical output line 16A at the time of occurrence of blooming becomes low, which hinders the increase in the speed. In such a case, when the driving power from the voltage VCLIPH to the voltage VCLIPL is relatively higher than the driving power from the voltage VCLIPL to the voltage VCLIPH, the reading speed may be improved.

Therefore, in the present embodiment, the switch SW12 for controlling the connection between the node to which the voltage VCLIPL is supplied and the interconnection VC is provided in each of the clip circuits 34, and the transition speed from the voltage VCLIPH to the voltage VCLIPL of the interconnection VC from the time t6 is improved. This makes it possible to increase the speed while suppressing an increase in chip area.

As described above, according to the present embodiment, the readout operation may be speeded up while suppressing an increase in chip area.

Third Embodiment

Figure 8:
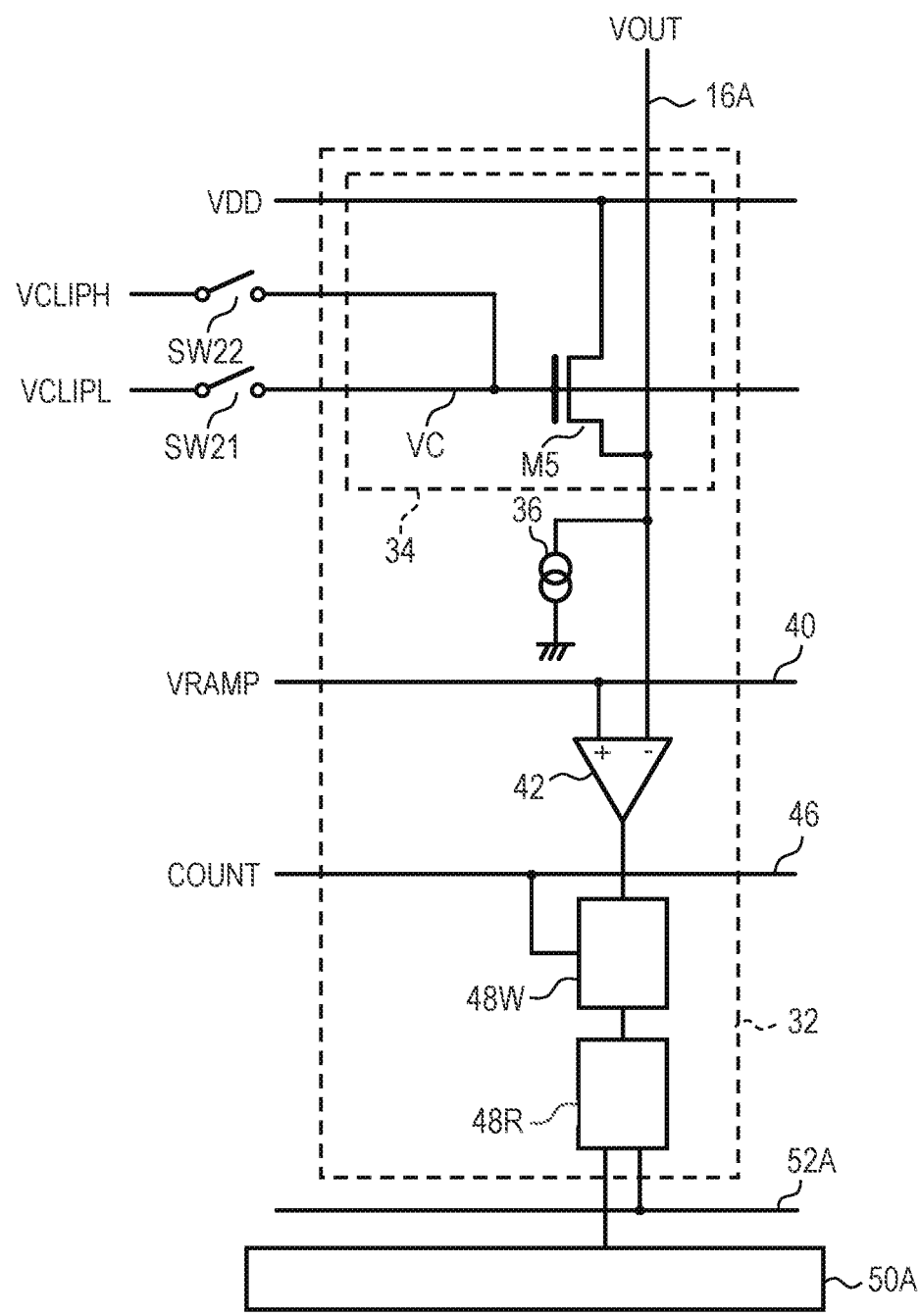
FIG. 8 is a circuit diagram illustrating a configuration example of a column circuit in a photoelectric conversion device according to a third embodiment of the present invention.

A photoelectric conversion device and a method of driving the same according to a third embodiment of the present invention will be described with reference to FIG. 8. The same components as those of the photoelectric conversion device according to the first and second embodiments are denoted by the same reference numerals, and the description thereof will be omitted or simplified. FIG. 8 is a circuit diagram illustrating a configuration example of a column circuit in the photoelectric conversion device according to the present embodiment.

The photoelectric conversion device according to the present embodiment is similar to the photoelectric conversion device according to the first embodiment except that the configuration of the clip circuit 34 is different.

As illustrated in FIG. 8, the clip circuit 34 of the present embodiment includes an n-channel transistor M5. A drain of the n-channel transistor M5 is connected to a node to which a power supply voltage (voltage VDD) is supplied. A source of the re-channel transistor M5 is connected to the vertical output line 16A. A gate of the n-channel transistor M5 is connected to the interconnection VC. A voltage VCLIPL may be supplied to the interconnection VC via the switch SW21. A voltage VCLIPH may be supplied to the interconnection VC via the switch SW22.

The switches SW21 and SW22 are switches common to the clip circuits 34 of the plurality of column circuits 32 of the readout circuit 30A. In other words, the interconnection VC is connected to the node to which the voltage VCLIPL is supplied via one switch SW21, and is connected to the node to which the voltage VCLIPH is supplied via one switch SW22.

A voltage generation circuit (not illustrated) for generating the voltage VCLIPH, a voltage generation circuit (not illustrated) for generating the voltage VCLIPL, and the switches SW21 and SW22 may also be referred to as a voltage supply circuit for supplying the voltage VCLIPH and the voltage VCLIPL to the interconnection VC.

In the present embodiment, by making the size of the switch SW22 larger than the size of the switch SW21, the driving power from the voltage VCLIPL to the voltage VCLIPH is relatively higher than the driving power from the voltage VCLIPH to the voltage VCLIPL. With this configuration, as in the first embodiment, it is possible to increase the speed while suppressing an increase in chip area.

Instead of or in addition to changing the characteristics (size and ON resistance) of the switch SW21 and the switch SW22, the output resistance of the voltage generation circuit of the voltage VCLIPH may be lower than the output resistance of the voltage generation circuit of the voltage VCLIPL. For example, an operational amplifier having a relatively large area and a small output resistance is used for the voltage generation circuit of the voltage VCLIPH, and an operational amplifier having a relatively small area and a large output resistance is used for the voltage generation circuit of the voltage VCLIPL. With this configuration, it is possible to increase the speed while suppressing an increase in chip area.

As described above, according to the present embodiment, the readout operation may be speeded up while suppressing an increase in chip area.

Fourth Embodiment

Figure 9:
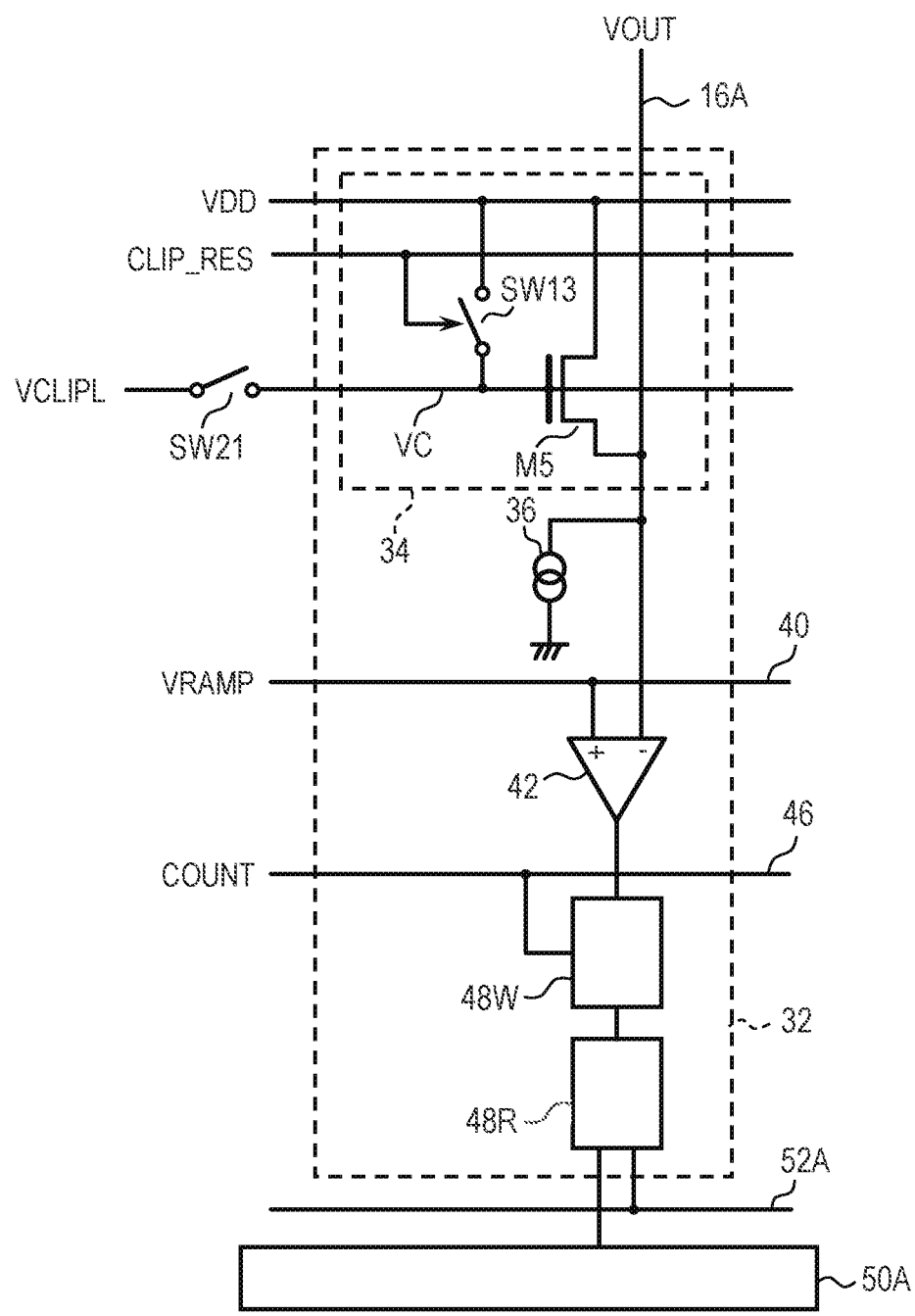
FIG. 9 is a circuit diagram illustrating a configuration example of a column circuit in a photoelectric conversion device according to a fourth embodiment of the present invention.

A photoelectric conversion device and a method of driving the same according to a fourth embodiment of the present invention will be described with reference to FIG. 9. The same components as those in the first to third embodiments are denoted by the same reference numerals, and the description thereof will be omitted or simplified. FIG. 9 is a circuit diagram illustrating a configuration example of a column circuit in the photoelectric conversion device according to the present embodiment.

The photoelectric conversion device according to the present embodiment is similar to the photoelectric conversion device according to the first embodiment except that the configuration of the clip circuit 34 is different.

As illustrated in FIG. 9, the clip circuit 34 of the present embodiment includes an n-channel transistor M5 and a switch SW13. A drain of the n-channel transistor M5 is connected to a node to which a power supply voltage (voltage VDD) is supplied. A source of the n-channel transistor M5 is connected to the vertical output line 16A. One terminal of the switch SW13 is connected to a node to which the power supply voltage (voltage VDD) is supplied. The other terminal of the switch SW13 and a gate of the n-channel transistor M5 are connected to the interconnection VC. A voltage VCLIPL may be supplied to the interconnection VC via the switch SW21. A control signal CLIP_RES is supplied from the control circuit 70 to the control node of the switch SW13.

Like the switches SW11 and SW12 of the previous embodiments, the switch SW13 is an individual switch provided in the clip circuit 34 of each of the plurality of column circuits 32 of the readout circuit 30A. On the other hand, the switch SW21 is a switch common to the clip circuits 34 of the plurality of column circuits 32 of the readout circuit 30A. In other words, the interconnection VC is connected to the node to which the voltage VDD is supplied via a plurality of switches SW13 connected in parallel, and is connected to the node to which the voltage VCLIPL is supplied via one switch SW21.

The clip circuit 34 limits the lower limit of the voltage of the vertical output line 16A to a voltage corresponding to the voltage of the gate of the n-channel transistor M5. The gate of the n-channel transistor M5 becomes the voltage VDD when the switch SW13 is on and the switch SW21 is off, and becomes the voltage VCLIPL when the switch SW13 is off and the switch SW21 is on. Here, the switch SW13 is turned on (conductive state) when the control signal CLIP_RES is High-level, and turned off (non-conductive state) when the control signal CLIP_RES is Low-level.

A voltage generation circuit (not illustrated) for generating the voltage VCLIPL and the switches SW13 and SW21 may also be referred to as a voltage supply circuit for supplying the voltage VDD and the voltage VCLIPL to the interconnection VC.

Thus, in the present embodiment, the voltage VDD is used also in place of the voltage VCLIPH in the first embodiment. With this structure, the number of interconnections may be reduced. Alternatively, the interconnection for supplying the voltage VDD may be made wider by utilizing a space generated by reducing the number of interconnections for supplying the voltage VCLIPH. With this configuration, it is possible to further increase the driving power when the interconnection VC transitions from the voltage VCLIPL to the voltage VDD.

As described above, according to the present embodiment, the readout operation may be speeded up while suppressing an increase in chip area.

Fifth Embodiment

Figure 10:
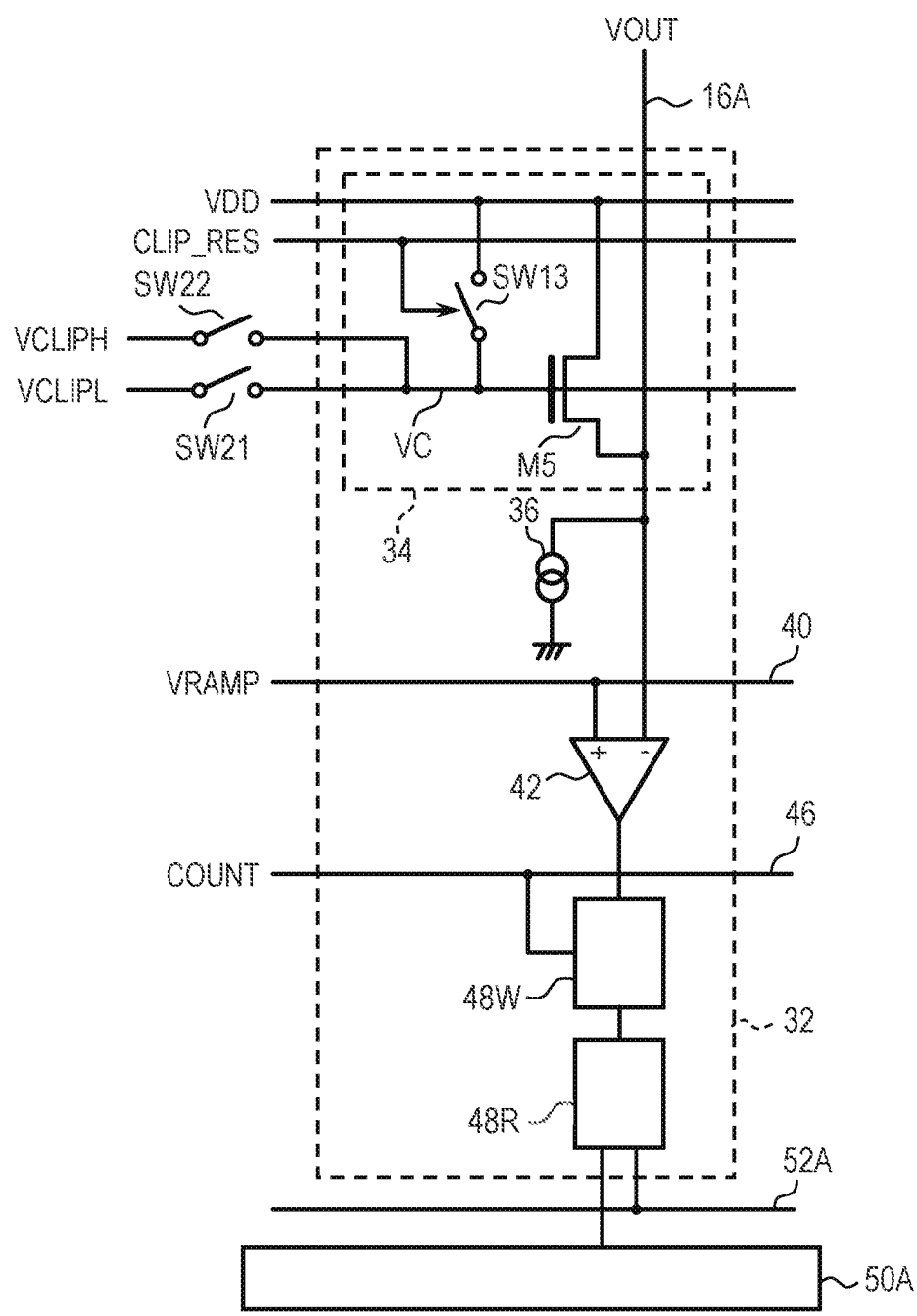
FIG. 10 is a circuit diagram illustrating a configuration example of a column circuit in a photoelectric conversion device according to a fifth embodiment of the present invention.

A photoelectric conversion device and a method of driving the same according to a fifth embodiment of the present invention will be described with reference to FIG. 10 and FIG. 11. The same components as those of the photoelectric conversion devices according to the first to fourth embodiments are denoted by the same reference numerals, and the description thereof will be omitted or simplified. FIG. 10 is a circuit diagram illustrating a configuration example of a column circuit in the photoelectric conversion device according to the present embodiment. FIG. 11 is a timing chart illustrating a method of driving the photoelectric conversion device according to the present embodiment.

The photoelectric conversion device according to the present embodiment is similar to the photoelectric conversion device according to the first embodiment except that the configuration of the clip circuit 34 is different.

As illustrated in FIG. 10, the clip circuit 34 of the present embodiment includes an n-channel transistor M5 and a switch SW13. A drain of the n-channel transistor M5 is connected to a node to which a power supply voltage (voltage VDD) is supplied. A source of the n-channel transistor M5 is connected to the vertical output line 16A. One terminal of the switch SW13 is connected to the node to which the power supply voltage (voltage VDD) is supplied. The other terminal of the switch SW13 and a gate of the n-channel transistor M5 are connected to the interconnection VC. A voltage VCLIPL may be supplied to the interconnection VC via the switch SW21. A voltage VCLIPH may be supplied to the interconnection VC via the switch SW22. A control signal CLIP_RES is supplied from the control circuit 70 to the control node of the switch SW13.

As described in the fourth embodiment, the switch SW13 is an individual switch provided in the clip circuit 34 of each of the plurality of column circuits 32 of the readout circuit 30A. On the other hand, the switches SW21 and SW22 are switches common to the clip circuits 34 of the plurality of column circuits 32 of the readout circuit 30A. In other words, the interconnection VC is connected to the node to which the voltage VDD is supplied via a plurality of switches SW13 connected in parallel. The interconnection VC is connected to the node to which the voltage VCLIPL is supplied via one switch SW21, and is connected to the node to which the voltage VCLIPH is supplied via one switch SW22.

The clip circuit 34 limits the lower limit of the voltage of the vertical output line 16A to a voltage corresponding to the voltage of the gate of the n-channel transistor M5. The gate of the n-channel transistor M5 becomes the voltage VDD when the switch SW13 is on and the switches SW21 and SW22 are off. The gate of the n-channel transistor M5 becomes the voltage VCLIPL when the switches SW13 and SW22 are off and the switch SW21 is on, and becomes the voltage VCLIPH when the switches SW13 and SW21 are off and the switch SW22 is on.

A voltage generation circuits (none of which are illustrated) for generating the voltages VCLIPH and VCLIPL and the switches SW13, SW21, and SW22 may also be referred to as a voltage supply circuit for supplying the voltages VDD, VCLIPH, and VCLIPL to the interconnection VC.

Next, a method of driving the photoelectric conversion device according to the present embodiment will be described with reference to FIG. 11 focusing on points different from the driving method according to the first embodiment. FIG. 11 is a timing chart illustrating a pixel signal readout operation in an arbitrary row of the pixel array unit 10. FIG. 11 illustrates the levels of the control signals PTX, PRES, and CLIP_RES, the voltage of the reference signal VRAMP, the voltage of the signal VOUT, and the voltage of the interconnection VC.

In the driving method of the present embodiment, during the period from time t0 to time t1 and the period from time t11 to time t12, the control signal CLIP_RES is controlled to High-level to turn on the switch SW13 and reset the interconnection VC to the voltage VDD. Then, at time t1 and time t12, the control signal CLIP_RES is controlled to Low-level to turn off the switch SW13, and at the same time, the switch SW22 is turned on. Accordingly, the voltage of the interconnection VC transitions to the voltage VCLIPH.

By driving in this manner, the voltage VCLIPH may be used to stop the potential of the vertical output line 16A from decreasing during the period from time t1 to time t6, and the voltage VDD may be used to reset the vertical output line 16A during the period from time t11 to time t12. Thus, the voltage (the voltage VCLIPH) for stopping the reduction of the potential and the voltage (the voltage VDD) for resetting the vertical output line 16A may be individually optimized.

As described above, according to the present embodiment, the readout operation may be speeded up while suppressing an increase in chip area.

Sixth Embodiment

An imaging system according to a sixth embodiment of the present invention will be described with reference to FIG. 12. FIG. 12 is a block diagram illustrating a schematic configuration of an imaging system according to the present embodiment.

The photoelectric conversion device 100 described in the first to fifth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 12 is a block diagram of a digital still camera.

The imaging system 200 illustrated in FIG. 12 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system for focusing light on the imaging device 201. The imaging device 201 is the photoelectric conversion device 100 described in any of the first to fifth embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric conversion unit of the imaging device 201 is formed, or may be formed on a semiconductor substrate different from the semiconductor layer on which the photoelectric conversion unit of the imaging device 201 is formed. The signal processing unit 208 may be formed on the same semiconductor substrate as the imaging device 201.

The imaging system 200 further includes a memory unit 210 for temporarily storing image data, and an external interface unit (external I/F unit) 212 for communicating with an external computer or the like. The imaging system 200 further includes a storage medium 214 such as a semiconductor memory for storing or reading out imaging data, and a storage medium control interface unit (storage medium control I/F unit) 216 for storing or reading out imaging data on or from the storage medium 214. The storage medium 214 may be built in the imaging system 200 or may be detachable.

The imaging system 200 further includes a general control/operation unit 218 that controls various calculations and the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, an imaging system to which the photoelectric conversion device 100 according to the first to fifth embodiments is applied may be realized.

Seventh Embodiment

Figure 13A:
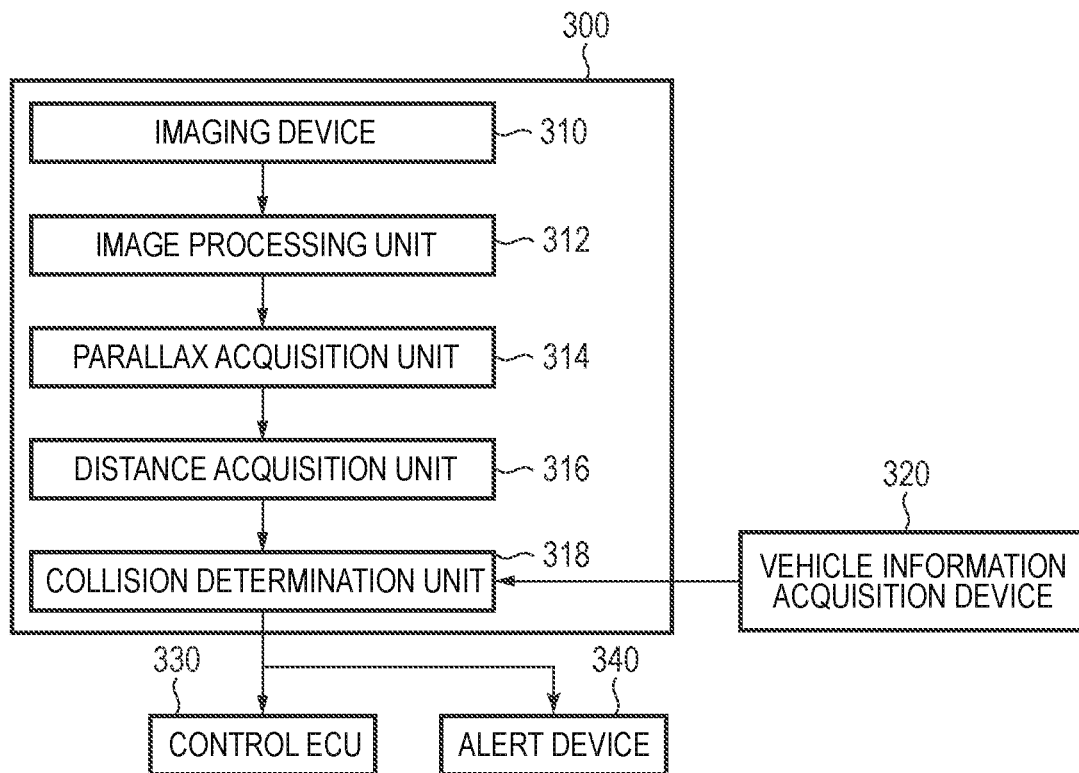
FIG. 13A is a diagram illustrating a configuration example of an imaging system according to a seventh embodiment of the present invention.
Figure 13B:
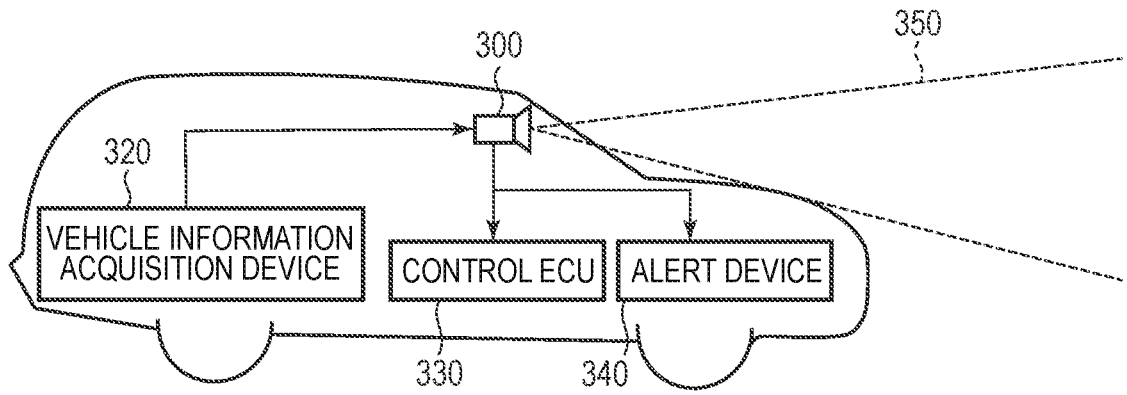
FIG. 13B is a diagram illustrating a configuration example of a movable object according to the seventh embodiment of the present invention.

An imaging system and a movable object according to a seventh embodiment of the present invention will be described with reference to FIG. 13A and FIG. 13B. FIG. 13A is a diagram illustrating a configuration of an imaging system according to the present embodiment. FIG. 13B is a diagram illustrating a configuration of a movable object according to the present embodiment.

FIG. 13A illustrates an example of an imaging system related to an in-vehicle camera. The imaging system 300 includes an imaging device 310. The imaging device 310 is the photoelectric conversion device 100 according to any one of the first to fifth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to the object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition unit may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 13B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the present invention is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the present invention may be applied not only to a movable object but also to an apparatus using object recognition in a wide range such as an intelligent transport system (ITS).

Eighth Embodiment

Figure 14:
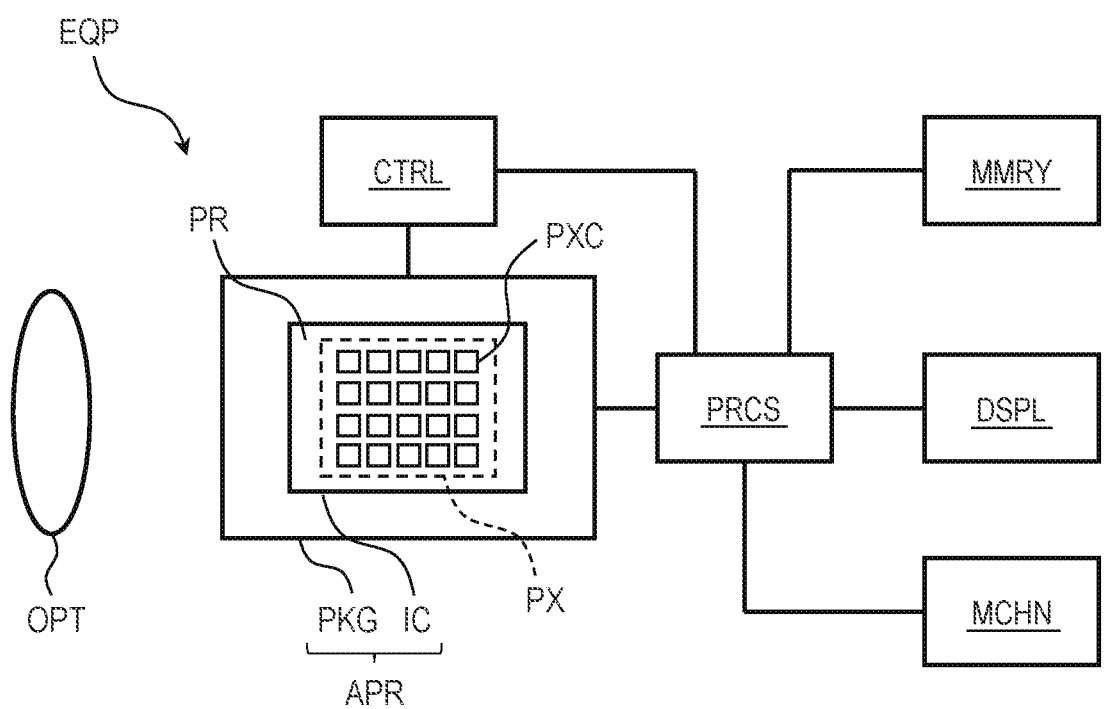
FIG. 14 is a block diagram illustrating a schematic configuration of equipment according to an eighth embodiment of the present invention.

Equipment according to an eighth embodiment of the present invention will be described with reference to FIG. 14. FIG. 14 is a block diagram illustrating a schematic configuration of equipment according to the present embodiment.

FIG. 14 is a schematic diagram illustrating equipment EQP including a photoelectric conversion device APR. The photoelectric conversion device APR has the function of the photoelectric conversion device 100 according to any one of the first to fifth embodiments. All or part of the photoelectric conversion device APR is a semiconductor device IC. The photoelectric conversion device APR of this example may be used as, for example, an image sensor, an AF (Auto Focus) sensor, a photometric sensor, or a distance measuring sensor. The semiconductor device IC has a pixel area PX in which pixel circuits PXC including photoelectric conversion units are arranged in a matrix. The semiconductor device IC may have a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each of the peripheral circuits in the second semiconductor chip may be a column circuit corresponding to a pixel column of the first semiconductor chip. The peripheral circuits in the second semiconductor chip may be matrix circuits corresponding to pixels or pixel blocks of the first semiconductor chip. As the connection between the first semiconductor chip and the second semiconductor chip, an inter-chip interconnection by direct bonding of a through electrode (TSV) and a conductor such as copper, a connection by microbumps between chips, a connection by wire bonding, or the like may be employed.

The photoelectric conversion device APR may include, in addition to the semiconductor device IC, a package PKG accommodating the semiconductor device IC. The package PKG may include a base body to which the semiconductor device IC is fixed, a lid body such as glass facing the semiconductor device IC, and a connecting member such as a bonding wire or a bump connecting a terminal provided on the base body and a terminal provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is a semiconductor device such as an ASIC. The processing device PRCS processes a signal output from the photoelectric conversion device APR, and constitutes an AFE (analog front end) or a DFE (digital front end). The processing device PRCS is a semiconductor device such as a central processing unit (CPU) or an application specific integrated circuit (ASIC). The display device DSPL is an EL display device or a liquid crystal display device that displays information (image) obtained by the photoelectric conversion device APR. The storage device MMRY is a magnetic device or a semiconductor device that stores information (image) obtained by the photoelectric conversion device APR. The storage device MMRY is a volatile memory such as an SRAM or a DRAM, or a nonvolatile memory such as a flash memory or a hard disk drive. The mechanical device MCHN has a movable portion or a propulsion portion such as a motor or an engine. In the equipment EQP, a signal output from the photoelectric conversion device APR is displayed on the display device DSPL, or transmitted to the outside by a communication device (not illustrated) included in the equipment EQP. To this end, the equipment EQP preferably further includes a storage device MMRY and a processing device PRCS in addition to a storage circuit unit and an arithmetic circuit unit included in the photoelectric conversion device APR.

The equipment EQP illustrated in FIG. 14 may be an electronic device such as an information terminal (e.g., a smartphone or a wearable terminal) having a photographing function or a camera (For example, an interchangeable lens camera, a compact camera, a video camera, and a surveillance camera.). The mechanical device MCHN in the camera may drive components of the optical device OPT for zooming, focusing, and shutter operation. The equipment EQP may be a transportation equipment (movable object) such as a vehicle, a ship, or an airplane. The equipment EQP may be a medical device such as an endoscope or a CT scanner. The equipment EQP may be a medical device such as an endoscope or a CT scanner.

The mechanical device MCHN in the transport device may be used as a mobile device. The equipment EQP as a transport device is suitable for transporting the photoelectric conversion device APR or for assisting and/or automating driving (steering) by an imaging function. The processing device PRCS for assisting and/or automating driving (steering) may perform processing for operating the mechanical device MCHN as the mobile device based on information obtained by the photoelectric conversion device APR.

The photoelectric conversion device APR according to the present embodiment may provide a high value to the designer, the manufacturer, the seller, the purchaser, and/or the user. Therefore, when the photoelectric conversion device APR is mounted on the equipment EQP, the value of the equipment EQP may be increased. Therefore, when the equipment EQP is manufactured and sold, determining the mounting of the photoelectric conversion device APR of the present embodiment on the equipment EQP is advantageous in increasing the value of the equipment EQP.

MODIFIED EMBODIMENTS

The present invention is not limited to the above embodiments, and various modifications are possible.

For example, an example in which a configuration of a part of any embodiment is added to another embodiment or an example in which a configuration of a part of another embodiment is substituted is also an embodiment of the present invention.

The circuit configuration of the pixel 12 illustrated in FIG. 2 is an example, and may be changed as appropriate. For example, each pixel 12 may include two or more photoelectric conversion elements. Further, a plurality of photoelectric conversion elements of one pixel 12 may constitute a pupil division pixel sharing one microlens. The pixel 12 need not necessarily include the select transistor M4. The capacitance value of the node FD may be switchable.

Although one vertical output line is arranged in each column in the above embodiment, two or more vertical output lines may be arranged in each column. In this case, each pixel 12 may be connected to one of the vertical output lines in each column, or may include a plurality of select transistors corresponding to the number of vertical output lines in each column.

The comparator 42 may further include capacitors and switches for auto-zero operation.

The imaging systems described in the fifth and sixth embodiments are examples of an imaging system to which the photoelectric conversion device of the present invention may be applied, and the imaging system to which the photoelectric conversion device of the present invention may be applied is not limited to the configurations illustrated in FIG. 12 and FIG. 13A. The equipment described in the seventh embodiment is an example of equipment to which the photoelectric conversion device of the present invention may be applied, and the equipment to which the photoelectric conversion device of the present invention may be applied is not limited to the configuration illustrated in FIG. 14.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-062658, filed Apr. 1, 2021, which is hereby incorporated by reference herein in its entirety.

What is claimed is:
1. A photoelectric conversion device comprising:
a plurality of pixels arranged in a plurality of columns, each of the plurality of pixels including a photoelectric conversion element and outputting a signal corresponding to an amount of charge generated by the photoelectric conversion element;
a plurality of output lines provided corresponding to the plurality of columns, each of the plurality of output lines outputting a signal of a pixel of a corresponding column;
a plurality of column circuits that is provided corresponding to the plurality of columns and each includes a clip circuit that constitutes a source follower circuit and includes a transistor having a source connected to the output line of a corresponding column and an interconnection connected to a gate of the transistor; and
a voltage supply circuit configured to supply a first voltage and a second voltage to the interconnection,
wherein a driving power when controlling the interconnection to the first voltage by the voltage supply circuit differs from a driving power when controlling the interconnection to the second voltage by the voltage supply circuit,
wherein the interconnection is an interconnection common to the clip circuits of the plurality of column circuits,
wherein the voltage supply circuit includes:
a plurality of first switches that is provided corresponding to the clip circuits of the plurality of column circuits and is configured to connect a node to which the first voltage is supplied and the interconnection, and
a second switch configured to connect a node to which the second voltage is supplied and the interconnection, and
wherein the driving power when the interconnection is controlled to the first voltage by the voltage supply circuit is higher than the driving power when the interconnection is controlled to the second voltage by the voltage supply circuit.

2. An imaging system comprising:
the photoelectric conversion device according to claim 1; and
a signal processing unit that processes a signal output from the photoelectric conversion device.

3. A movable object comprising:
the photoelectric conversion device according to claim 1;
a distance information acquisition unit configured to acquire distance information to an object from a parallax image based on a signal from the photoelectric conversion device; and
a control unit configured to control the movable object based on the distance information.

4. An equipment comprising:
the photoelectric conversion device according to claim 1; and
at least one of:
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

5. The photoelectric conversion device according to claim 1, wherein a difference between a voltage of the output line when the interconnection has the first voltage and a voltage of the output line when the interconnection has the second voltage is equal to or greater than a voltage corresponding to a saturation output of the pixel.

6. The photoelectric conversion device according to claim 1, wherein the voltage supply circuit is further configured to be capable of supplying a third voltage to the interconnection.

7. The photoelectric conversion device according to claim 6,
wherein the voltage supply circuit further includes a third switch configured to connect a node to which the third voltage is supplied and the interconnection, and
wherein the transition speed when the interconnection is controlled to the first voltage by the voltage supply circuit is higher than a transition speed when the interconnection is controlled to the third voltage by the voltage supply circuit.

8. The photoelectric conversion device according to claim 6, wherein a difference between a voltage of the output line when the interconnection has the second voltage and a voltage of the output line when the interconnection has the third voltage is equal to or greater than a voltage corresponding to a saturation output of the pixel.

9. The photoelectric conversion device according to claim 1, wherein the first voltage is a power supply voltage.

10. The photoelectric conversion device according to claim 1, wherein the voltage supply circuit includes:
a first switch configured to connect a node to which the first voltage is supplied and the interconnection, and
a second switch configured to connect a node to which the second voltage is supplied and the interconnection.

11. The photoelectric conversion device according to claim 10, wherein an ON resistance of the first switch and an ON resistance of the second switch are different from each other.

12. The photoelectric conversion device according to claim 10,
wherein the voltage supply circuit includes a first voltage generation circuit configured to generate the first voltage, and a second voltage generation circuit configured to generate the second voltage, and
wherein an output resistance of the first voltage generation circuit and an output resistance of the second voltage generation circuit are different from each other.

13. The photoelectric conversion device according to claim 10, wherein a difference between a voltage of the output line when the interconnection has the first voltage and a voltage of the output line when the interconnection has the second voltage is equal to or greater than a voltage corresponding to a saturation output of the pixel.

14. A photoelectric conversion device comprising:
a plurality of pixels arranged in a plurality of columns, each of the plurality of pixels including a photoelectric conversion element and outputting a signal corresponding to an amount of charge generated by the photoelectric conversion element;
a plurality of output lines provided corresponding to the plurality of columns, each of the plurality of output lines outputting a signal of a pixel of a corresponding column;
a plurality of column circuits that is provided corresponding to the plurality of columns and each includes a clip circuit that constitutes a source follower circuit and includes a transistor having a source connected to the output line of a corresponding column and an interconnection connected to a gate of the transistor; and
a voltage supply circuit configured to supply a first voltage and a second voltage to the interconnection,
wherein a driving power when controlling the interconnection to the first voltage by the voltage supply circuit differs from a driving power when controlling the interconnection to the second voltage by the voltage supply circuit, wherein the interconnection is an interconnection common to the clip circuits of the plurality of column circuits, wherein the voltage supply circuit includes:
- a plurality of first switches that is provided corresponding to the clip circuits of the plurality of column circuits and is configured to connect a node to which the first voltage is supplied and the interconnection, and
- a second switch configured to connect a node to which the second voltage is supplied and the interconnection, and wherein the number of the first switches provided between the node to which the first voltage is supplied and the interconnection is larger than the number of the second switches provided between the node to which the second voltage is supplied and the interconnection.

15. An imaging system comprising:
the photoelectric conversion device according to claim 14; and
a signal processing unit that processes a signal output from the photoelectric conversion device.

16. A movable object comprising:
the photoelectric conversion device according to claim 14;
a distance information acquisition unit configured to acquire distance information to an object from a parallax image based on a signal from the photoelectric conversion device; and
a control unit configured to control the movable object based on the distance information.

17. An equipment comprising:
the photoelectric conversion device according to claim 14; and
at least one of:
- an optical device corresponding to the photoelectric conversion device,
- a control device configured to control the photoelectric conversion device,
- a processing device configured to process a signal output from the photoelectric conversion device,
- a mechanical device that is controlled based on information obtained by the photoelectric conversion device,
- a display device configured to display information obtained by the photoelectric conversion device, and
- a storage device configured to store information obtained by the photoelectric conversion device.

18. The photoelectric conversion device according to claim 14, wherein a difference between a voltage of the output line when the interconnection has the first voltage and a voltage of the output line when the interconnection has the second voltage is equal to or greater than a voltage corresponding to a saturation output of the pixel.

19. The photoelectric conversion device according to claim 14, wherein the voltage supply circuit is further configured to be capable of supplying a third voltage to the interconnection.

20. The photoelectric conversion device according to claim 19,
wherein the voltage supply circuit further includes a third switch configured to connect a node to which the third voltage is supplied and the interconnection, and
wherein the transition speed when the interconnection is controlled to the first voltage by the voltage supply circuit is higher than a transition speed when the interconnection is controlled to the third voltage by the voltage supply circuit.

21. The photoelectric conversion device according to claim 19, wherein a difference between a voltage of the output line when the interconnection has the second voltage and a voltage of the output line when the interconnection has the third voltage is equal to or greater than a voltage corresponding to a saturation output of the pixel.

22. The photoelectric conversion device according to claim 14, wherein the first voltage is a power supply voltage.

23. The photoelectric conversion device according to claim 14, wherein the voltage supply circuit includes:
a first switch configured to connect a node to which the first voltage is supplied and the interconnection, and
a second switch configured to connect a node to which the second voltage is supplied and the interconnection.

24. The photoelectric conversion device according to claim 23, wherein an ON resistance of the first switch and an ON resistance of the second switch are different from each other.

25. The photoelectric conversion device according to claim 23,
wherein the voltage supply circuit includes a first voltage generation circuit configured to generate the first voltage, and a second voltage generation circuit configured to generate the second voltage, and
wherein an output resistance of the first voltage generation circuit and an output resistance of the second voltage generation circuit are different from each other.

26. The photoelectric conversion device according to claim 23, wherein a difference between a voltage of the output line when the interconnection has the first voltage and a voltage of the output line when the interconnection has the second voltage is equal to or greater than a voltage corresponding to a saturation output of the pixel.

* * * * *